US012212089B2

(12) United States Patent
Sakai

(10) Patent No.: US 12,212,089 B2
(45) Date of Patent: Jan. 28, 2025

(54) FIRST AND SECOND CONNECTORS ATTACHABLE TO AND DETACHABLE FROM EACH OTHER, AND CONNECTOR ASSEMBLY INCLUDING THE SAME

(71) Applicant: SUMITOMO WIRING SYSTEMS, LTD., Mie (JP)

(72) Inventor: Hiroki Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 336 days.

(21) Appl. No.: 17/700,946

(22) Filed: Mar. 22, 2022

(65) Prior Publication Data

US 2022/0320779 A1 Oct. 6, 2022

(30) Foreign Application Priority Data

Mar. 31, 2021 (JP) ................................ 2021-059391

(51) Int. Cl.

| | |
|---|---|
| ***H01R 13/42*** | (2006.01) |
| ***H01R 13/502*** | (2006.01) |
| ***H01R 13/52*** | (2006.01) |
| ***H01R 13/627*** | (2006.01) |
| ***H01R 13/629*** | (2006.01) |

(52) U.S. Cl.

CPC ........... *H01R 13/42* (2013.01); *H01R 13/502* (2013.01); *H01R 13/5219* (2013.01); *H01R 13/6271* (2013.01); *H01R 13/629* (2013.01)

(58) Field of Classification Search

CPC .................. H01R 13/629; H01R 13/64; H01R 13/641; H01R 13/6456

See application file for complete search history.

(56) References Cited

U.S. PATENT DOCUMENTS

| | | | | |
|---|---|---|---|---|
| 4,755,149 | A * | 7/1988 | de Jong ............. | H01R 13/6315 439/655 |
| 6,830,485 | B2 * | 12/2004 | Koehler ............. | H01R 13/6315 439/660 |
| 6,890,220 | B2 * | 5/2005 | Wang ..................... | H01R 13/64 439/680 |
| 7,241,058 | B2 * | 7/2007 | Takamatsu ........... | G02B 6/3895 439/577 |
| 2009/0111301 | A1 * | 4/2009 | Hiramatsu ............. | H01R 13/64 439/133 |
| 2009/0149057 | A1 * | 6/2009 | Takeda ............... | H01R 13/6456 439/374 |
| 2020/0153152 | A1 | 5/2020 | Mamiya et al. | |

* cited by examiner

*Primary Examiner* — Oscar C Jimenez

(74) *Attorney, Agent, or Firm* — Venjuris, P.C.

(57) ABSTRACT

A first connector 20 attachable to and detachable from a second connector 70 includes a plurality of first terminal members 21 having tip parts extending in a first direction X1, and a first connector housing 30 for holding the plurality of first terminal members 21. The first connector housing 30 includes side walls 43 having tip parts extending in the first direction X1. The side wall 43 includes a first fitting portion 50 to be convex-concavely fit to a second fitting portion 100 provided in the second connector 70. The first fitting portion 50 is engaged with the second fitting portion 100 in a second direction Y1 intersecting an assembling direction D1 of the first and second connectors 20, 70.

18 Claims, 15 Drawing Sheets

FIRST AND SECOND CONNECTORS ATTACHABLE TO AND DETACHABLE FROM EACH OTHER, AND CONNECTOR ASSEMBLY INCLUDING THE SAME

CROSS-REFERENCE TO RELATED APPLICATIONS

This application is based on and claims priority from Japanese Patent Application No. 2021-059391, filed on Mar. 31, 2021, with the Japan Patent Office, the disclosure of which is incorporated herein in their entireties by reference.

TECHNICAL FIELD

The present disclosure relates to a first connector, a second connector and a connector assembly.

BACKGROUND

Conventionally, a wiring harness including a wire and a connector mounted on an end part of the wire is known as a wiring harness to be mounted in a vehicle such as a hybrid or electric vehicle. The connector includes a terminal made of metal and connected to the end part of the wire and a connector housing for holding the terminal (see, for example, Japanese Patent Laid-open Publication No. 2020-080269).

SUMMARY

However, if vibration is applied to the aforementioned connector, the connector housing may relatively move with respect to a mating connector and the terminal held in the connector housing may relatively move with respect to a mating terminal. If the terminal relatively moves with respect to the mating terminal, there is a problem that a contact point between the terminal and the mating terminal is worn.

The present disclosure aims to provide a first connector, a second connector and a connector assembly capable of suppressing the wear of contact points.

This object is solved according to the invention by the features of the independent claims. Particular embodiments of the invention are subject of the dependent claims.

According to one aspect, there is provided a first connector attachable to and detachable from a second connector and which includes one or more, particularly a plurality of first terminal members having respective tip parts extending in a first direction and a first connector housing for holding the oner or more, particularly the plurality of first terminal members, wherein the first connector housing includes at least one first wall having a tip part extending in the first direction, the first wall includes a first fitting portion to be convex-concavely fit or form-fit to or mesh with a second fitting portion provided in the second connector, and the first fitting portion is engaged with the second fitting portion in a second direction intersecting an assembling direction of the first and second connectors when the first connector is mated to the second connector.

According to a further aspect, there is provided a second connector attachable to and detachable from a first connector which includes one or more, particularly a plurality of second terminal members, an inner housing for accommodating the one or more, particularly the plurality of second terminal members, and an outer housing for at least partly accommodating the inner housing, wherein the inner housing is a component separate from the outer housing, the inner housing includes at least one second fitting portion to be convex-concavely fit or form-fit to a first fitting portion provided in the first connector, and the second fitting portion is to be engaged with the first fitting portion in a second direction intersecting an assembling direction of the first and second connectors.

According to a still further aspect, there is provided a connector assembly including a first connector according to the above aspect and a second connector according to the above further aspect attachable to and detachable from the first connector, particularly wherein the first connector includes one or more, particularly a plurality of first terminal members having respective tip parts extending in a first direction and a first connector housing for holding or positioning the one or more, particularly the plurality of first terminal members, the first connector housing includes at least one first wall having a tip part extending in the first direction, the first wall includes a first fitting portion to be convex-concavely fit or form-fit to a second fitting portion provided in the second connector, and the first fitting portion is engaged with the second fitting portion in a second direction intersecting an assembling direction of the first and second connectors.

According to the above, it is possible to achieve an effect of suppressing the wear of contact points.

Further particular embodiments are listed and described as follows.

Particularly, a first connector attachable to and detachable from a second connector includes a plurality of first terminal members having tip parts extending in a first direction and a first connector housing for holding the plurality of first terminal members, wherein the first connector housing includes a first wall having a tip part extending in the first direction, the first wall includes a first fitting portion to be convex-concavely fit to a second fitting portion provided in the second connector, and the first fitting portion is engaged with the second fitting portion in a second direction intersecting an assembling direction of the first and second connectors.

According to this configuration, the first connector housing is provided with the first fitting portion to be convex-concavely fit to the second fitting portion provided in the mating second connector and engaged with the second fitting portion in the second direction intersecting the assembling direction of the first and second connectors. By the engagement of this first fitting portion with the second fitting portion, a movement of the first connector housing in the second direction is restricted. Thus, even if vibration is applied to the first connector assembled with the second connector, it is possible to suppress a relative movement of the first connector housing with respect to the second connector in the second direction. In this way, it is possible to suppress relative movements of the first terminal members held in the first connector housing with respect to second terminal members provided in the second connector. As a result, the wear of contact points between the first terminal members and the second terminal members can be suitably suppressed.

Further particularly, the first fitting portion includes a first projection extending from the first wall along a third direction intersecting the first and second directions and projecting toward the first terminal member, the first terminal member has a first surface facing the first projection in the third direction, and a shortest distance L1 between a tip of the first projection and the first surface of the first terminal member in the third direction is a first distance.

According to this configuration, the shortest distance L1 between the tip of the first projection projecting in the third direction from the first wall and the first surface of the first terminal member is set as the first distance. Here, the first distance is a distance in a range of about 3 mm and/or more and about 15 mm or less. The first distance is preferably a distance in a range of about 6 mm or more and/or about 12 mm or less, more preferably a distance in a range of about 6 mm or more and/or about 9 mm or less. By setting the shortest distance L1 as the first distance, it can be suppressed that a worker's finger enters a clearance between the tip of the first projection and the first surface of the first terminal member. Thus, it can be suppressed that the worker's finger contacts the first terminal member through the clearance between the tip of the first projection and the first surface of the first terminal member.

Here, "facing each other" in this specification means that surfaces or members are at positions in front of each other and means not only a case where the both are perfectly at the positions in front of each other, but also a case where the both are at positions partially in front of each other. Further, "facing each other" in this specification means both a case where another member is present between two parts and a case where nothing is present between two parts.

Further particularly, the first surface of the first terminal member is a connection surface to be connected to the second terminal member provided in the second connector. According to this configuration, it can be suppressed that the worker's finger enters a clearance between the tip of the first projection and the connection surface of the first terminal member. Thus, it can be suppressed that the worker's finger contacts the connection surface of the first terminal member through the clearance between the tip of the first projection and the connection surface of the first terminal member.

Further particularly, the first terminal member has a second surface provided on a side opposite to the first surface in the third direction, the first connector housing includes a second wall having a tip part extending in the first direction, the second wall is provided on a side substantially opposite to the first wall across the first terminal member in the third direction, the second wall has a third surface facing the second surface of the first terminal member in the third direction, and a shortest distance L2 between the third surface of the second wall and the second surface of the first terminal member in the third direction and the shortest distance L1 satisfy a relationship of L2≤L1. According to this configuration, the shortest distance L2 between the third surface of the second wall and the second surface of the first terminal member is set equal to or shorter than the shortest distance L1, i.e. equal to or shorter than the first distance. In this way, it can be suppressed that the worker's finger enters a clearance between the third surface of the second wall and the second surface of the first terminal member. Thus, it can be suppressed that the worker's finger contacts the first terminal member through the clearance between the third surface of the second wall and the second surface of the first terminal member.

Further particularly, the plurality of first terminal members are provided substantially side by side along the third direction, and the first wall is provided between the plurality of first terminal members in the third direction. According to this configuration, the first fitting portion is provided on the first wall provided between the plurality of first terminal members. Thus, the first fitting portion can be provided near the plurality of first terminal members. Therefore, relative movements of the first terminal members provided near the first fitting portion can be suitably suppressed.

Further particularly, the assembling direction is a direction parallel to the first direction, and the first connector housing includes a protecting portion for covering around the first terminal members except parts in the second direction in directions orthogonal to the first direction, a first opening open in the first direction in the protecting portion, and a second opening open in the second direction in the protecting portion. According to this configuration, the second opening is open in the second direction in which the first and second fitting portions are engaged. In other words, the first and second fitting portions are engaged with each other in the second direction in which the second opening is open. Here, in the case of including the second opening open in the second direction intersecting the assembling direction of the first and second connectors, the first connector housing easily relatively moves with respect to the second connector in the second direction, in which the second opening is open, when the second connector is assembled with the first connector. In view of this, the first fitting portion is provided to be engaged with the second fitting portion in the second direction in the above configuration, wherefore a relative movement of the first connector housing with respect to the second connector in the second direction can be suitably suppressed.

Further particularly, the protecting portion includes a pair of side walls constituting the second opening, the first wall is one of the pair of side walls, and the first projection projects toward the first terminal member from an inner surface of the one side wall. According to this configuration, the first fitting portion is provided on the inner surface of the side wall constituting the protecting portion surrounding the outer peripheries of the first terminal members. Thus, the first fitting portion can be provided near the first terminal members. Therefore, relative movements of the first terminal members provided near the first fitting portion can be suitably suppressed.

Further particularly, the plurality of first terminal members include two first terminal members substantially adjacent to each other in the third direction, the protecting portion includes a first protecting portion for protecting one of the two first terminal members and a second protecting portion for protecting the other of the two first terminal members, the first fitting portion includes the first projection provided on the first protecting portion and a second projection provided on the second protecting portion, the first projection projects toward the one first terminal member from an inner surface of a side wall provided between the two first terminal members in the third direction, out of the first protecting portion, and the second projection projects toward the other first terminal member from an inner surface of a side wall at least partly provided between the two first terminal members in the third direction, out of the second protecting portion. According to this configuration, the first and second protecting portions for individually protecting the two first terminal members are provided.

Further, the first fitting portion particularly includes the first projection provided on the first protecting portion and the second projection provided on the second protecting portion. In other words, the first fitting portions are provided on both the first and second protecting portions. Thus, the first fitting portions can be respectively provided near the two first terminal members. Therefore, relative movements of the two first terminal members can be suitably suppressed.

Further particularly, the first fitting portion includes the first projection and a first recess recessed from a projecting end surface of the first projection, the first projection has at least one first inclined surface inclined with respect to a plane orthogonal to the assembling direction, and the first inclined surface guides at least one third projection of the second fitting portion into the first recess when the second connector is assembled with the first connector. According to this configuration, the first projection has the first inclined surface for guiding the third projection of the second fitting portion of the second connector into the first recess when the second connector is assembled with the first connector. Thus, the first and second fitting portions can be easily convex-concavely fit when the second connector is assembled with the first connector. In this way, the second connector can be easily assembled with the first connector.

Further particularly, the first recess has at least one second inclined surface inclined with respect to the plane orthogonal to the assembling direction, and the second inclined surface guides the third projection of the second fitting portion into the first recess when the second connector is assembled with the first connector. According to this configuration, the first recess has the second inclined surface for guiding the third projection of the second fitting portion of the second connector into the first recess when the second connector is assembled with the first connector. Thus, the first and second fitting portions can be easily convex-concavely fit when the second connector is assembled with the first connector. In this way, the second connector can be easily assembled with the first connector.

Further particularly, the first connector housing includes at least one base portion for holding base end parts of the first terminal members, the first wall projecting in the first direction from the base portion, and at least one reinforcing portion coupling a base end part of the first wall and the base portion. According to this configuration, the base portion of the first connector housing and the base end part of the first wall are coupled by the reinforcing portion. Thus, it can be suppressed that the first wall swings when vibration is applied to the first connector as compared to a configuration not including the reinforcing portion. In this way, a relative movement of the first connector housing can be suppressed and, consequently, relative movements of the first terminal members can be suppressed.

According to another particular embodiment, a second connector attachable to and detachable from a first connector includes a plurality of second terminal members, an inner housing for at least partly accommodating the plurality of second terminal members and an outer housing for accommodating the inner housing, wherein the inner housing is a component separate from the outer housing, the inner housing includes a second fitting portion to be convex-concavely fit to a first fitting portion provided in the first connector, and the second fitting portion is engaged with the first fitting portion in a second direction intersecting an assembling direction of the first and second connectors.

According to this configuration, the inner housing is provided with the second fitting portion to be convex-concavely fit to the first fitting portion provided in the mating first connector and engaged with the first fitting portion in the second direction intersecting the assembling direction of the first and second connectors. By the engagement of this second fitting portion with the first fitting portion, a movement of the inner housing in the second direction is restricted. Thus, even if vibration is applied to the second connector assembled with the first connector, it is possible to suppress a relative movement of the inner housing with respect to the first connector in the second direction. In this way, it can be suppressed that the second terminal members accommodated in the inner housing relatively move with respect to the first terminal members provided in the first connector. As a result, the wear of contact points between the first and second terminal members can be suitably suppressed.

Particularly, the inner housing includes a base portion and at least one terminal accommodating portion extending from the base portion, the terminal accommodating portion at least partly accommodates the one or more second terminal members inside, and the second fitting portion is provided on an outer surface of the terminal accommodating portion. According to this configuration, the second fitting portion is provided on the outer surface of the terminal accommodating portion for accommodating the second terminal members inside. Thus, the second fitting portion can be provided near the second terminal members. Therefore, relative movements of the second terminal members provided near the second fitting portion can be suitably suppressed.

Further particularly, the plurality of second terminal members are provided substantially side by side along a third direction intersecting the second direction, the terminal accommodating portion includes a first terminal accommodating portion and a second terminal accommodating portion provided away from the first terminal accommodating portion in the third direction, the first terminal accommodating portion has a first facing surface facing the second terminal accommodating portion in the third direction, the second terminal accommodating portion has a second facing surface facing the first facing surface, and the second fitting portion includes a third projection substantially projecting toward the second facing surface from the first facing surface and a fourth projection projecting toward the first facing surface from the second facing surface. According to this configuration, the second fitting portion includes the third projection provided on the first facing surface of the first terminal accommodating portion and the fourth projection provided on the second facing surface of the second terminal accommodating portion. In other words, the second fitting portions are provided on both the first and second terminal accommodating portions. Thus, the second fitting portions can be provided near the second terminal member accommodated in the first terminal accommodating portion and near the second terminal member accommodated in the second terminal accommodating portion. Therefore, relative movements of the second terminal members provided near the second fitting portions can be suitably suppressed. Further, the third and fourth projections are provided to face each other in the third direction. Thus, when the second connector is assembled with the first connector, the first fitting portion of the first connector is provided between the third and fourth projections in the third direction. Therefore, the third and fourth projections of the second fitting portions are convex-concavely fit to the first fitting portion from both sides in the third direction. In this way, a relative movement of the inner housing with respect to the first connector can be more suitably suppressed and relative movements of the second terminal members can be more suitably suppressed.

Further particularly, the second fitting portion includes the third projection and a second recess recessed toward the first facing surface from a projecting end surface of the third projection, the third projection has at least one third inclined surface inclined with respect to a plane orthogonal to the assembling direction, and the third inclined surface guides a first projection of the first fitting portion into the second recess when the second connector is assembled with the first connector. According to this configuration, the third projection has the third inclined surface for guiding the first projection of the first fitting portion of the first connector into the second recess when the second connector is assembled with the first connector. Thus, when the second connector is assembled with the first connector, the first and second fitting portions can be easily convex-concavely fit. In this way, the second connector can be easily assembled with the first connector.

Further particularly, the second recess has at least one fourth inclined surface inclined with respect to the plane orthogonal to the assembling direction, and the fourth inclined surface guides the first projection of the first fitting portion into the second recess when the second connector is assembled with the first connector. According to this configuration, the first recess has the fourth inclined surface for guiding the first projection of the first fitting portion of the first connector into the second recess when the second connector is assembled with the first connector. Thus, when the second connector is assembled with the first connector, the first and second fitting portions can be easily convex-concavely fit. In this way, the second connector can be easily assembled with the first connector.

Further particularly, the second connector further includes an inner member to be mounted on the outer housing, and the inner member supports the inner housing inside the outer housing. According to this configuration, the inner housing is supported by the inner member inside the outer housing. Thus, if vibration is applied to the second connector, it can be suppressed that the inner housing swings inside the outer housing as compared to a configuration not including the inner member. In this way, a relative movement of the inner housing can be suppressed and, consequently, relative movements of the second terminal members can be suppressed.

Further particularly, the first and second terminal accommodating portions are integrally or unitarily formed through the base portion, and the inner member supports the inner housing by contacting the base portion.

According to this configuration, the first and second terminal accommodating portions are integrally formed through the base portion. Thus, the number of components can be reduced as compared to the case where the first and second terminal accommodating portions are configured as separate components. Further, both the first and second terminal accommodating portions can be supported by the contact of the inner member with the base portion. Thus, the structure of the inner member can be simplified as compared to the case where structures for supporting the first terminal accommodating portion and the second terminal accommodating portion are individually provided.

According to another particular embodiment, a connector assembly includes a first connector and a second connector attachable to and detachable from the first connector, wherein the first connector includes one or more, particularly a plurality of first terminal members having tip parts extending in a first direction and a first connector housing for holding or positioning the one or more, particularly the plurality of first terminal members, the first connector housing includes at least one first wall having a tip part substantially extending in the first direction, the first wall includes at least one first fitting portion to be convex-concavely fit or form-fit to a second fitting portion provided in the second connector, and the first fitting portion is engaged or engageable with the second fitting portion in a second direction intersecting an assembling direction of the first and second connectors.

According to this configuration, the first connector housing is provided with the first fitting portion to be convex-concavely fit to the second fitting portion provided in the second connector and engaged with the second fitting portion in the second direction intersecting the assembling direction of the first and second connectors. By the engagement of this first fitting portion with the second fitting portion, a movement of the first connector housing in the second direction is restricted. Thus, even if vibration is applied to the first connector assembled with the second connector, it is possible to suppress a relative movement of the first connector housing with respect to the second connector in the second direction. In this way, it is possible to suppress relative movements of the first terminal members held in the first connector housing with respect to second terminal members provided in the second connector. As a result, the wear of contact points between the first terminal members and the second terminal members can be suitably suppressed.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION

Specific examples of a first connector, a second connector and a connector assembly of the present disclosure are described below with reference to the drawings. In each figure, some of components may be shown in an exaggerated or simplified manner for the convenience of description. Further, a dimension ratio of each part may be different in each figure. “Parallel” and “orthogonal” in this specification mean not only strictly parallel and orthogonal, but also substantially parallel and orthogonal within a range in which functions and effects in an embodiment are achieved. Note that the present invention is not limited to these illustrations and is intended to be represented by claims and include all changes in the scope of claims and in the meaning and scope of equivalents.

(Overall Configuration of Connector Assembly 10)

Figure 1:
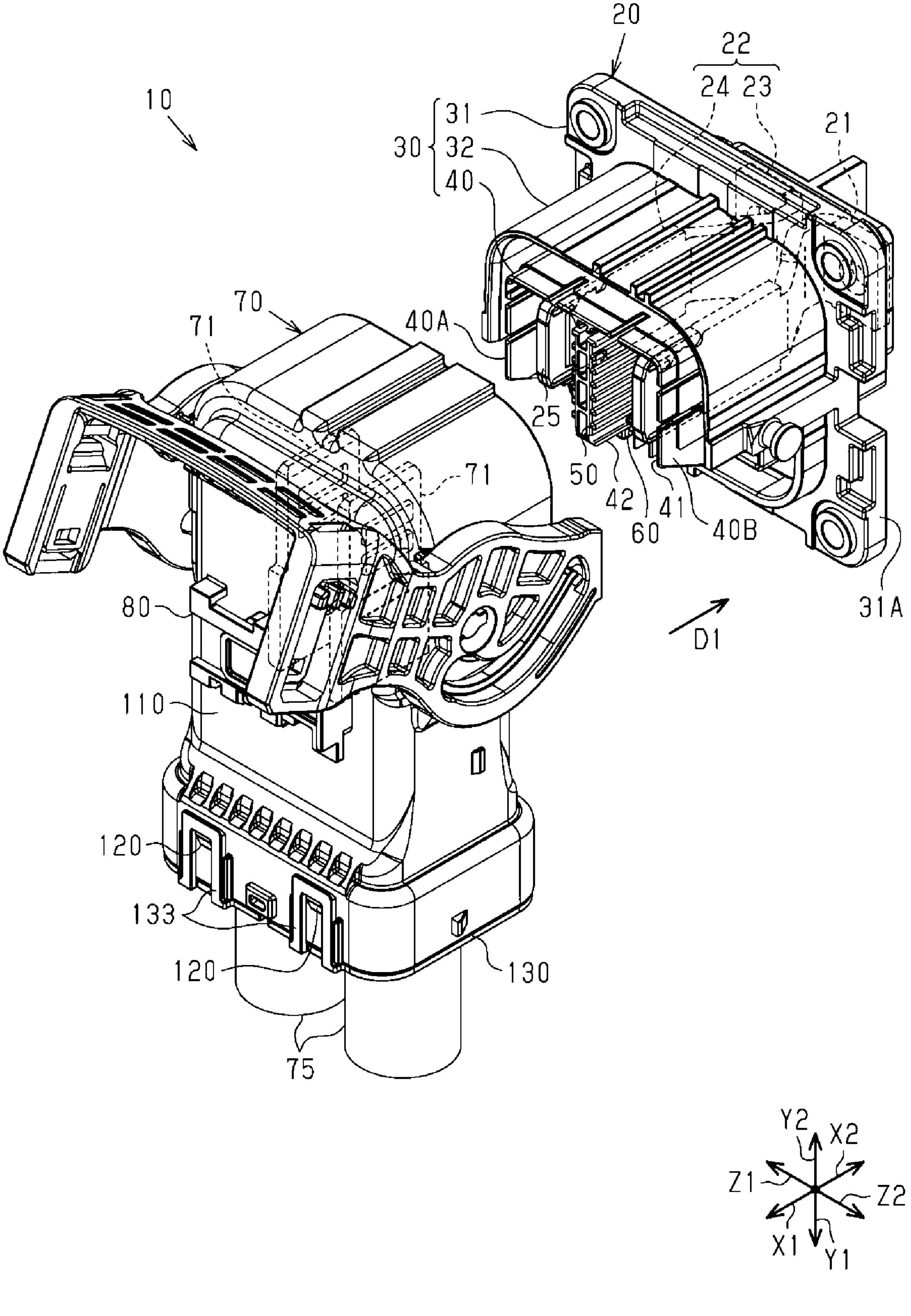
FIG. 1 is a schematic exploded perspective view showing a connector assembly of one embodiment.
Figure 2:
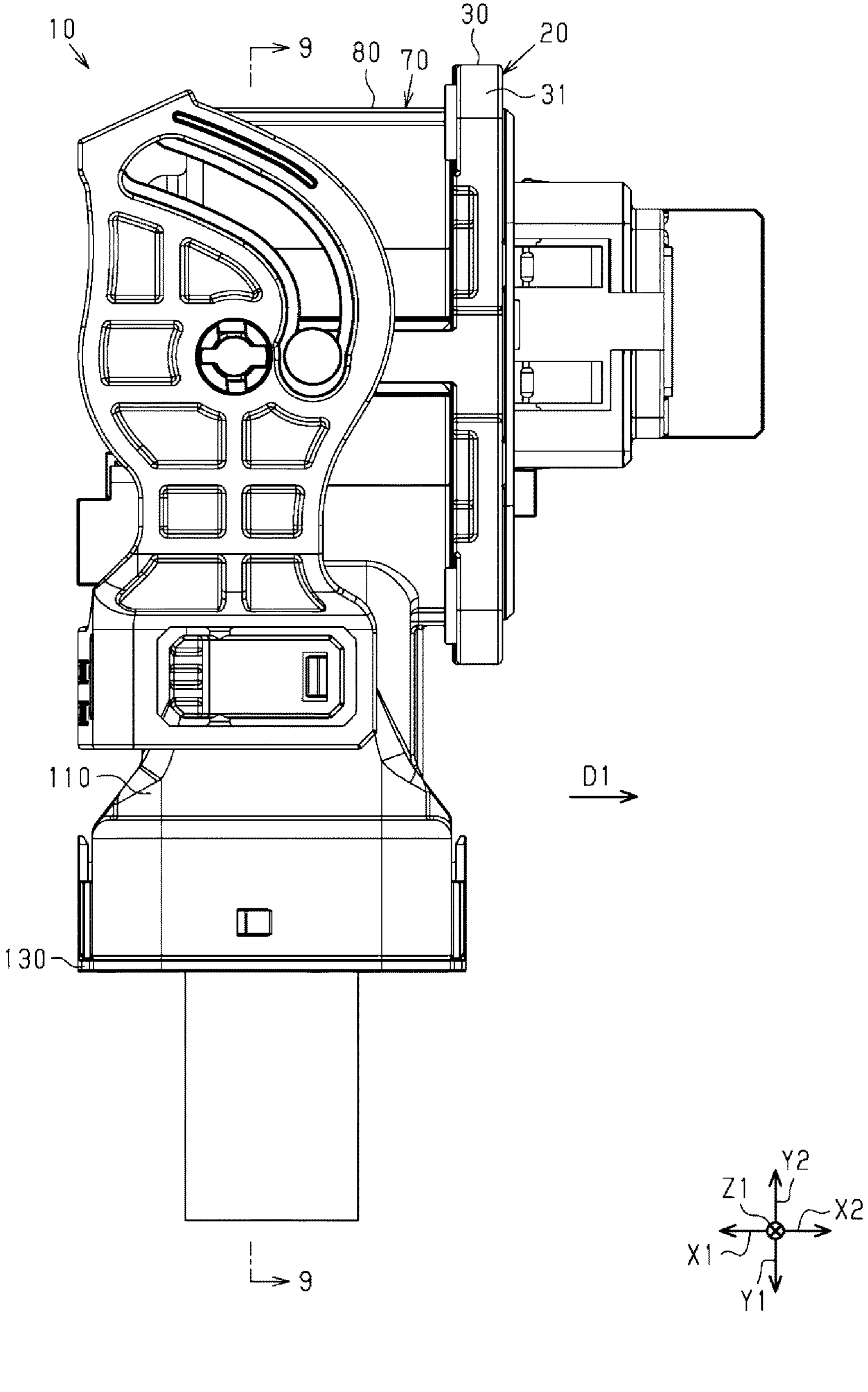
FIG. 2 is a schematic side view showing the connector assembly of the embodiment.

As shown in FIGS. 1 and 2, a connector assembly 10 includes a first connector 20 and a second connector 70 attachable to and detachable from the first connector 20.

Specifically, the connector assembly 10 is to be provided in a vehicle. For example, the vehicle includes a plurality of in-vehicle devices such as a high-voltage battery and an inverter. The plurality of in-vehicle devices are connected via a wiring harness. The connector assembly 10 is, for example, provided on end parts of the in-vehicle device and the wiring harness.

The first and second connectors 20, 70 are to be assembled with each other along an assembling direction D1. Note that the assembling direction D1 indicates a relative assembling direction of the second connector 70 with the first connector 20 and the first connector 20 is not limited as a fixed side. Further, a vertical direction in each figure does not necessarily indicate postures of the first and second connectors 20, 70 during use.

(Configuration of First Connector 20)

Figure 3:
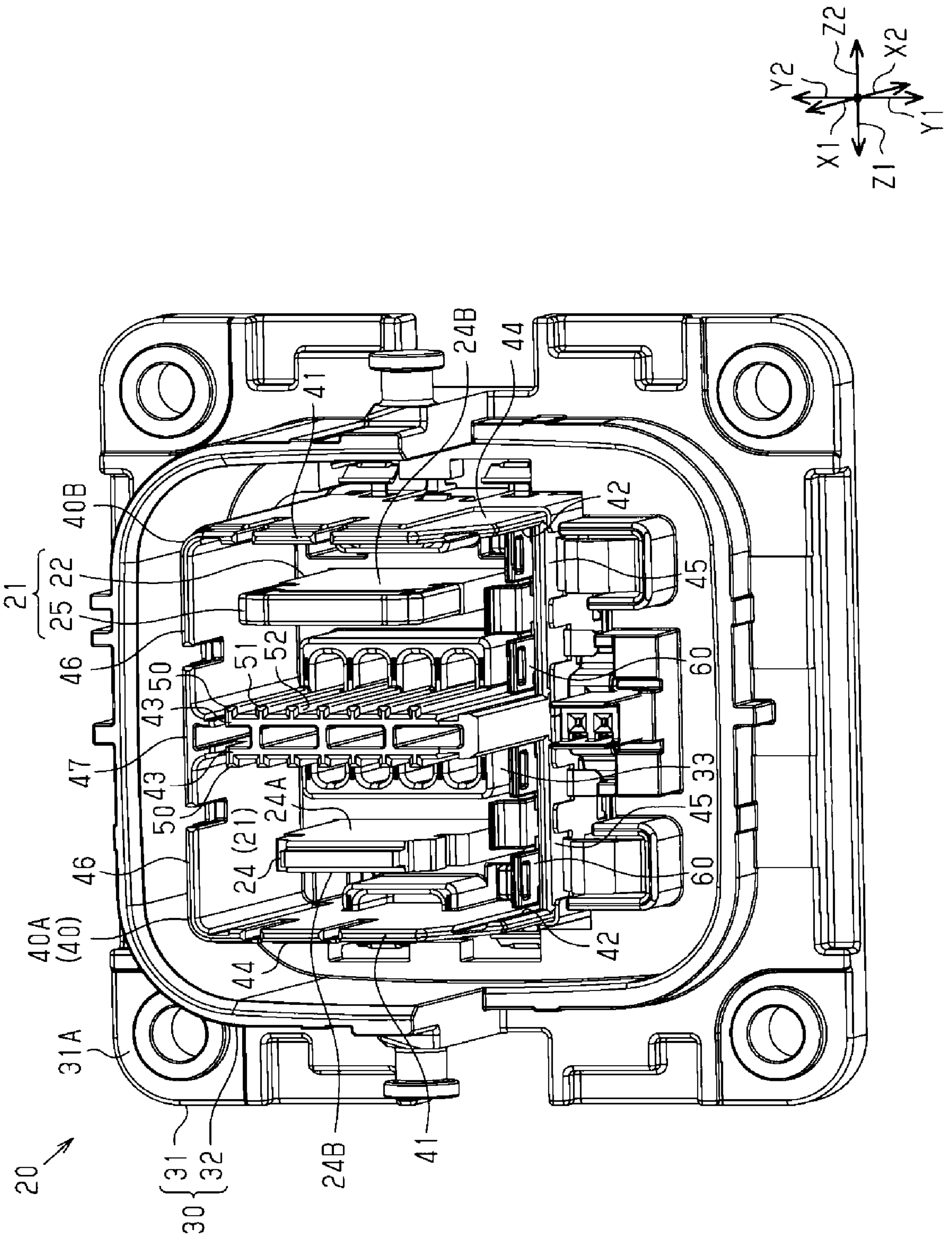
FIG. 3 is a schematic perspective view showing a first connector of the embodiment.
Figure 4:
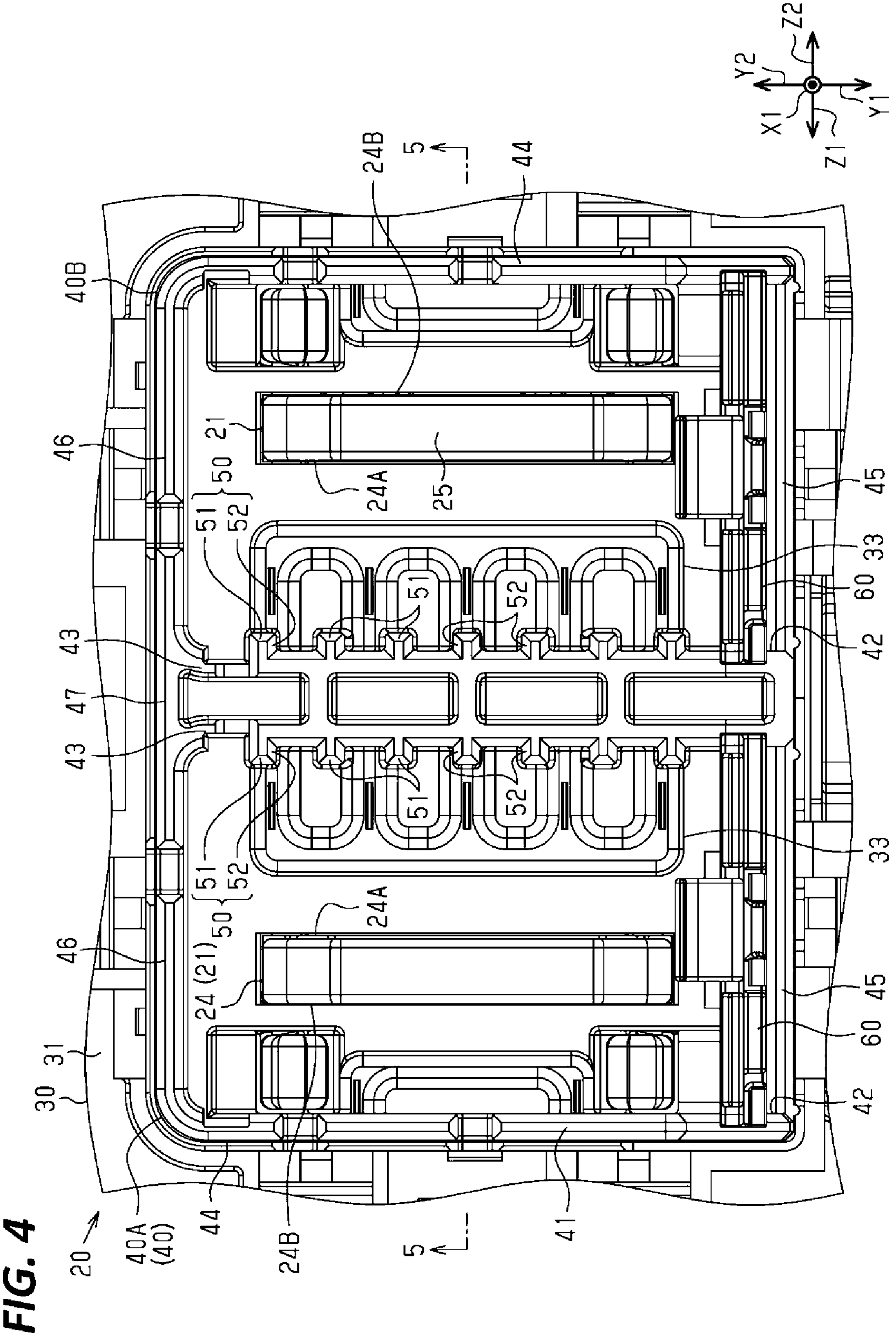
FIG. 4 is a schematic plan view enlargedly showing a part of the first connector of the embodiment.

As shown in FIGS. 3 and 4, the first connector 20 includes one or more (two in this embodiment) first terminal members 21, a first connector housing 30 for holding and/or positioning the first terminal members 21 and particularly one or more (two in this embodiment) slide members 60. The slide members 60 are held in the first connector housing 30.

(Configuration of First Terminal Members 21)

Figure 5:
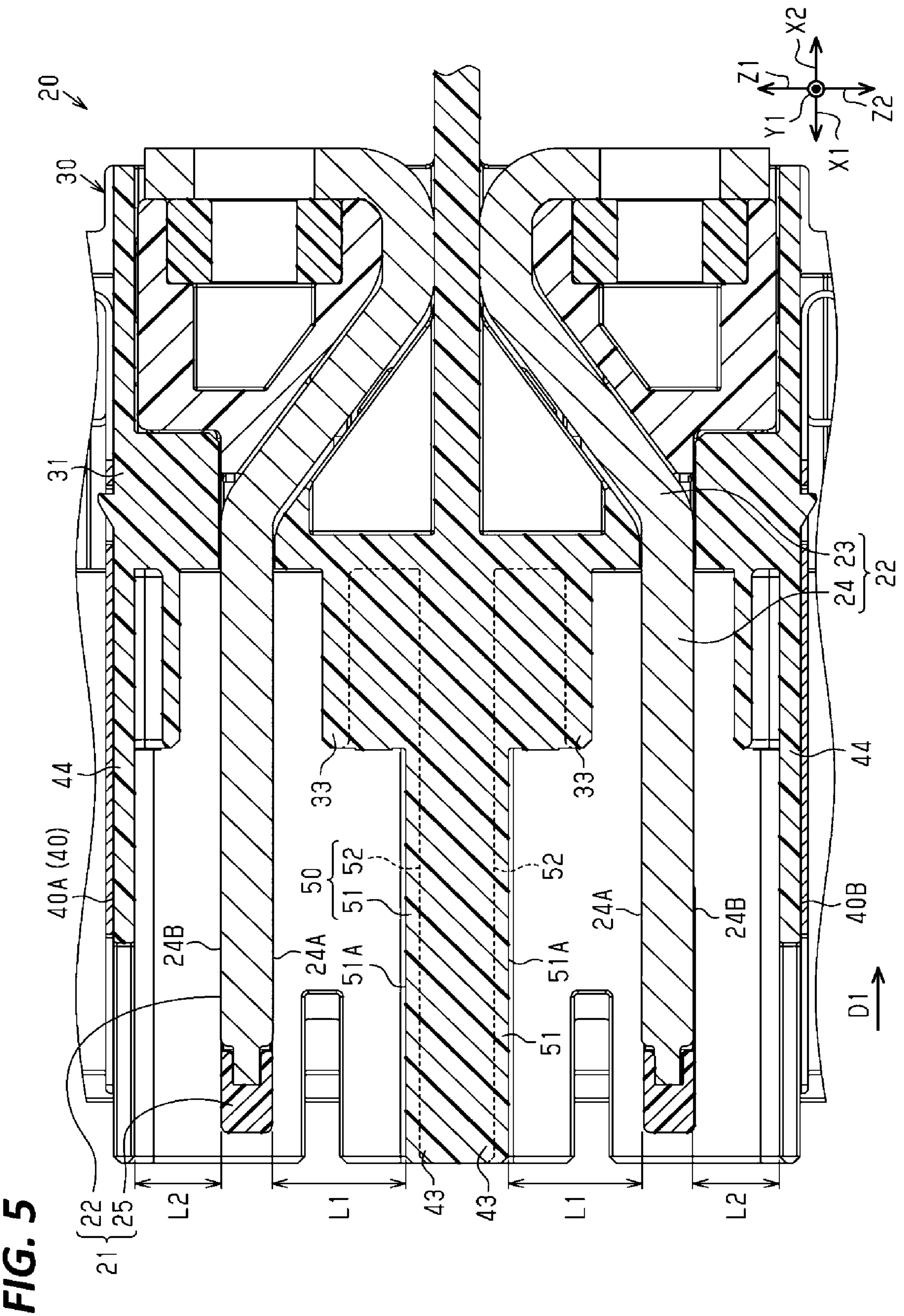
FIG. 5 is a schematic section (section along 5-5 in FIG. 4) enlargedly showing a part of the first connector of the embodiment.

As shown in FIG. 5, each first terminal member 21 includes at least one first terminal 22 (particularly made of a conductive material such as metal) and a protecting member 25.

The first terminal 22 includes a base portion 23 and a connecting portion 24 substantially extending in a first direction X1 from the base portion 23. A tip part of the connecting portion 24, i.e. a tip part of the first terminal 22 substantially extends in the first direction X1 from the base portion 23. In this embodiment, an extending direction of the tip part of the first terminal 22 is referred to as the first direction Z1 and a direction opposite to the first direction X1 is referred to as a first opposite direction X2. Note that the first direction X1 and the first opposite direction X2 of this embodiment are directions parallel to the assembling direction D1.

The first terminal 22 is, for example, a single component in which the base portion 23 and the connecting portion 24 are continuously and integrally or unitarily formed.

The first terminal 22 is, for example, formed by press-working a metal plate material made of copper, copper alloy, aluminum, aluminum alloy or the like.

As shown in FIG. 3, the connecting portion 24 particularly substantially is in the form of a flat plate. Specifically, an axial direction of the connecting portion 24 substantially extends along the first direction X1. A width direction of the connecting portion 24 substantially extends along a second direction Y1 orthogonal to the first direction Z1. A thickness direction of the connecting portion 24 substantially extends along a third direction Z1 intersecting (particularly substantially orthogonal to) both the first and second directions X1, Y1. One end surface in the width direction of the connecting portion 24 substantially is facing in the second direction Y1, and the other end surface in the width direction of the connecting portion 24 substantially is facing in a second opposite direction Y2, which is a direction opposite to the second direction Y1. One end surface in the thickness direction of the connecting portion 24 substantially is facing in the third direction Z1, and the other end surface in the thickness direction of the connecting portion 24 substantially is facing in a third opposite direction Z2, which is a direction opposite to the third direction Z1.

Out of the both end surfaces in the thickness direction of the connecting portion 24, one end surface is a connection surface 24A to be connected to a second terminal member 71 (see FIG. 1) of the second connector 70, and the other end surface is a non-connection surface 24B not to be connected to the second terminal member 71.

The connection surface 24A particularly is formed on a substantially flat surface extending in parallel to the first direction X1. The non-connection surface 24B particularly is formed on a substantially flat surface extending in parallel to the first direction Z1. Note that the protecting member 25 in one of the two first terminal members 21 is not shown in FIG. 3.

As shown in FIG. 5, the two first terminals 22 are provided substantially side by side along the third direction Z1. The two first terminals 22 are, for example, so arranged that the two connection surfaces 24A substantially face each other in the third direction Z1.

The protecting member 25 particularly is mounted or provided on the tip part of the connecting portion 24. The protecting member 25 is formed to at least partly cover the tip surface of the connecting portion 24. The protecting member 25 is, for example, made of an insulating resin material.

(Configuration of First Connector Housing 30)

As shown in FIG. 3, the first connector housing 30 includes, for example, a base portion 31, a peripheral wall portion 32 substantially extending in the first direction X1 from the base portion 31 and/or a protecting portion 40 substantially extending in the first direction X1 from the base portion 31 particularly inside the peripheral wall portion 32. The first connector housing 30 is, for example, a single component in which the base portion 31, the peripheral wall portion 32 and/or the protecting portion 40 are integrally or unitarily formed. The first connector housing 30 is, for example, made of an insulating resin material.

(Configuration of Base Portion 31)

The base portion 31 holds the one or more base portions 23 (see FIG. 5) of the one or more first terminals 22. The base portion 31 includes, for example, a fixing portion 31A projecting further outward than the peripheral wall portion 32. The fixing portion 31A is to be, for example, fixed to a case of the unillustrated in-vehicle device.

(Configuration of Peripheral Wall Portion 32)

The peripheral wall portion 32 particularly is formed into a partially cut ring shape. The peripheral wall portion 32 is, for example, substantially in the form of a rectangular ring extending in the first direction X1 as a whole. The peripheral wall portion 32 is, for example, formed by cutting a side in the first direction X1 of a surface in the second direction Y1 of the rectangular ring. The peripheral wall portion 32 collectively surrounds the outer peripheries of the two first terminal members 21.

Here, the "ring" in this specification means a ring-like structure continuous without any interruption as a whole, i.e. an endless structure having a start point and an end point coinciding with each other. Further, the "ring" in this specification means an arbitrary closed shape having an outer edge shape connected by straight and/or curved lines such as a circular ring having a circular outer edge shape, a ring having an elliptical or oval outer edge shape, a polygonal ring having a polygonal outer edge shape or a ring having a rounded polygonal outer edge shape. The "ring" is a shape having a through hole in a plan view and an outer edge shape and an inner peripheral shape of the through hole may be same or may be different. The "ring" may be a ring having a specified (predetermined or predeterminable) length along an axial direction along which a center axis passing through a center of the through hole extends, and that length does not matter. Further, the "ring" in this specification only has to be regarded as a ring as a whole and may be a ring having a cut, a slit or the like in a part such as a C shape.

(Configuration of Protecting Portion 40)

The protecting portion 40 includes one or more, particularly two protecting portions 40A, 40B for (particularly individually) protecting the one or more (e.g. two) first terminal members 21. Each protecting portion 40A, 40B substantially surrounds the outer periphery of each first terminal member 21.

The protecting portion 40A substantially surrounds the outer periphery of the first terminal member 21 arranged on a side in the third direction Z1, i.e. the terminal member 21 on a left side in FIG. 3, out of the two first terminal members 21.

The protecting portion 40B substantially surrounds the outer periphery of the first terminal member 21 arranged on a side in the third opposite direction Z2, i.e. the terminal member 21 on a right side in FIG. 3, out of the two first terminal members 21.

Each protecting portion 40A, 40B is in the form of a partially cut ring. Each protecting portion 40A, 40B is, for example, in the form of a rectangular ring extending in the first direction X1 as a whole.

The (particularly each) protecting portion 40A, 40B is formed to substantially cover around the first terminal member 21 except a part in the second direction Y1 in directions orthogonal to the first direction X1. Each protecting portion 40A, 40B is formed by cutting a side in the first direction X1 of a surface in the second direction Y1 of the rectangular ring. By this configuration, each protecting portion 40A, 40B particularly includes a first opening 41 opening in the first direction X1 and a second opening 42 open in the second direction Y1. The tip of each protecting portion 40A, 40B projects further in the first direction X1 than the tip of the first terminal member 21.

Each protecting portion 40A, 40B includes one or more, particularly a pair of side walls 43, 44, a lower wall 45 and/or an upper wall 46. The side walls 43, 44 substantially are facing each other in the third direction Z1. The inner surface of the side wall 43 substantially is facing the connection surface 24A of the connecting portion 24. The inner surface of the side wall 44 substantially is facing the non-connection surface 24B of the connecting portion 24. The lower wall 45 is a peripheral wall on the side in the second direction Y1 in each protecting portion 40A, 40B in the form of a rectangular ring. The upper wall 46 is a peripheral wall on the side in the second opposite direction Y2 in each protecting portion 40A, 40B particularly substantially in the form of a rectangular ring. The second opening 42 is provided in the lower wall 45. The second opening 42 is formed by cutting a side in the first direction X1 of the lower wall 45. The second opening 42 particularly substantially is surrounded by the pair of side walls 43, 44 and the lower wall 45.

The two protecting portions 40A, 40B particularly are provided substantially side by side along the third direction Z1. In this embodiment, both the side wall 43 of the protecting portion 40A and the side wall 43 of the protecting portion 40B substantially are provided between the two first terminal members 21 in the third direction Z1. The side wall 43 of the protecting portion 40A and the side wall 43 of the protecting portion 40B are, for example, integrally or unitarily formed by a coupling wall 47.

(Configuration of First Fitting Portions 50)

Figure 6:
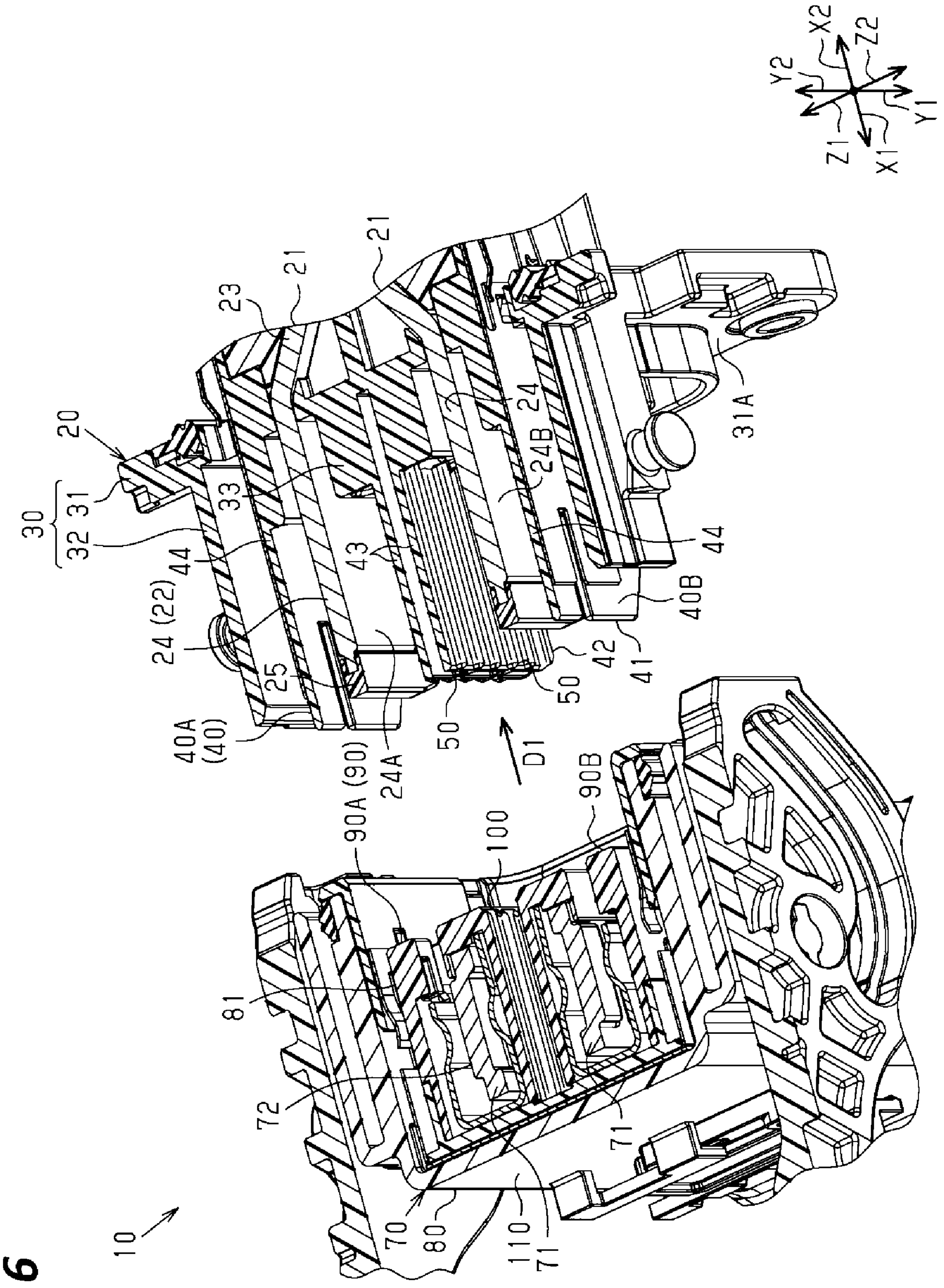
FIG. 6 is a schematic exploded perspective view partly in section showing the connector assembly of the embodiment.

As shown in FIG. 6, the first connector 20 includes, for example, one or more first fitting portions 50. The one or more first fitting portions 50 are to be convex-concavely fit or form fit to one or more respective second fitting portions 100 of the second connector 70. The first fitting portion(s) 50 is/are to be engaged with the second fitting portion(s) 100 in a direction intersecting the assembling direction D1 of the first and second connectors 20, 70. The first fitting portion(s) 50 is/are, for example, engaged with the second fitting portion(s) 100 in the second direction Y, which is an opening direction of the second opening 42. In other words, the first fitting portion 50 provided in the first connector 20 is engaged with the second fitting portion 100 provided in the second connector 70 in a direction (Y1 in the shown example) intersecting with the assembling direction D1 when the first and second connectors 20, 70 are properly mated. Specifically, an outline of the first fitting portion (50) substantially matches with or corresponds to an outline of the second fitting portion (100). Accordingly, the first fitting portion (50) and the second fitting portion (100) mesh with each other, when the first and second connectors 20, 70 are properly mated.

The one or more first fitting portions 50 are provided in the first connector housing 30. The one or more first fitting portions 50 are, for example, provided on the peripheral wall(s) of the protecting portion(s) 40A, 40B.

The one or more first fitting portions 50 are, for example, provided on the inner surface(s) of the side wall(s) 43 substantially facing the connection surface(s) 24A of the first terminal(s) 22, out of the peripheral wall(s) of the protecting portion(s) 40A, 40B.

The first fitting portions 50 of this embodiment specifically are provided on the inner surface of the side wall 43 of one protecting portion 40A and on the inner surface of the side wall 43 of the other protecting portion 40B. That is, the first connector housing 30 of this embodiment particularly includes two first fitting portions 50.

As shown in FIG. 4, each first fitting portion 50 includes one or more (seven in this embodiment) projections 51 and one or more (six in this embodiment) recesses 52. In each first fitting portion 50, the seven projections 51 and the six recesses 52 are alternately provided substantially side by side in the second direction Y1.

Figure 7:
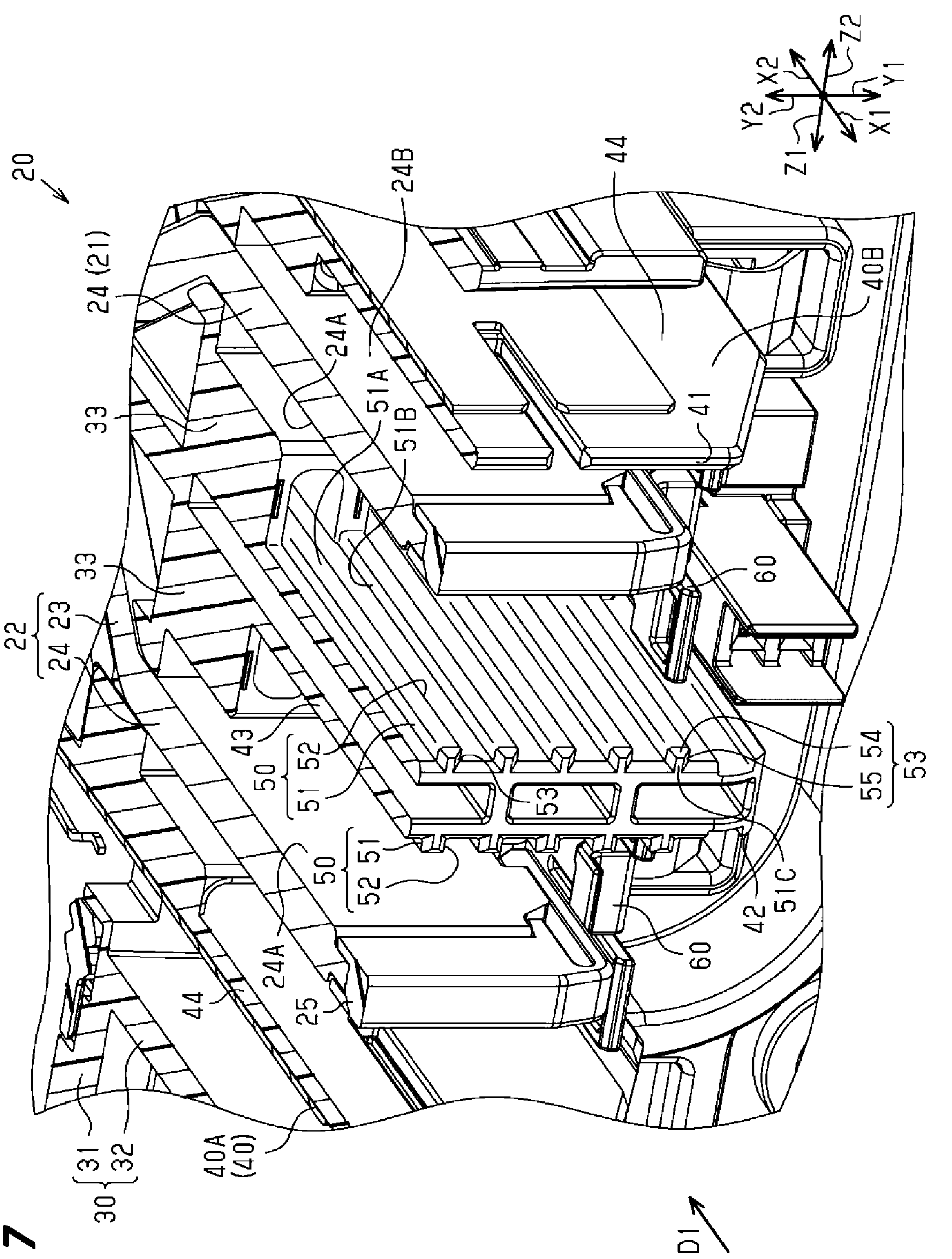
FIG. 7 is a schematic perspective view enlargedly showing a part of the first connector of the embodiment.

As shown in FIG. 7, each projection 51 particularly substantially projects toward the connection surface 24A of the first terminal 22 from the bottom surface of each recess 52. For example, each projection 51 substantially projects to extend along the third direction Z1 or third opposite direction Z2 from the bottom surface of each recess 52. For example, each projection 51 substantially projects to extend along the third direction Z1 orthogonal to the second direction Y1 in which the second opening 42 is open.

In this embodiment, the projections 51 (first projection) provided on the side wall 43 of the protecting portion 40A and the projections 51 (second projection) provided on the side wall 43 of the protecting portion 40B particularly project in directions substantially opposite to each other.

Specifically, the projections 51 provided on the side wall 43 of the protecting portion 40A substantially project in the third direction Z1 from the inner surface of the side wall 43, and the projections 51 provided on the side wall 43 of the protecting portion 40B substantially project in the third opposite direction Z2 from the inner surface of the side wall 43.

Each projection 51 substantially extends along the first opposite direction X2 particularly from a tip part of the side wall 43. An axial direction of each projection 51, in which a center axis of each projection 51 extends, substantially is parallel to the first direction X1.

Specifically, the (particularly each) projection 51 has a projecting end surface 51A, a pair of side surfaces 51B and an end surface 51C. The (particularly each) projecting end surface 51A is an end surface provided at a position most distant from the bottom surface of the recess 52 in the third direction Z1, out of end surfaces of each projection 51. In other words, the (each) projecting end surface 51A is an end surface provided at a position closest to the first terminal 22, out of the end surfaces of each projection 51.

The (particularly each) projecting end surface 51A substantially is facing the first terminal 22. The projecting end surface 51A particularly expands in the first direction X1 and/or in the second direction Y1. The (particularly each) side surface 51B particularly expands in the first direction X1 and/or in the third direction Z1. Each side surface 51B constitutes the inner side surface of the recess 52.

The end surface 51C is a surface in the first direction X1 in the projection 51. The end surface 51C is, for example, formed to be flush with the tip surface of the side wall 43. Each end surface 51C and the tip surface of the side wall 43 are facing the second connector 70 (see FIG. 6) in the first direction X1.

The (particularly each) recess 52 is formed to be recessed from the projecting end surface 51A of each projection 51. The (particularly each) recess 52 substantially extends along the first opposite direction X2 from the tip surface of the side wall 43.

The bottom surface of each recess 52 is, for example, substantially facing the connection surface 24A of the first terminal 22. A tip part of each recess 52, i.e. an end part in the first direction X1 of each recess 52, particularly is open, for example, in the first direction X1 parallel to the assembling direction D1.

Accordingly, when the first and second connectors 20, 70 are properly mated, the projection(s) 51 on the side wall 43 are (particularly completely) inserted into recess(es) 102 of the second connector 70 described hereinafter and/or projection(s) 101 of the second connector 70 described hereinafter are (particularly completely) inserted into the recess (es) 52 so that, as a result, the one or more first fitting portions 50 are convex-concavely fit to or form fit with or mesh with the one or more respective second fitting portions 100 of the second connector 70.

Figure 8:
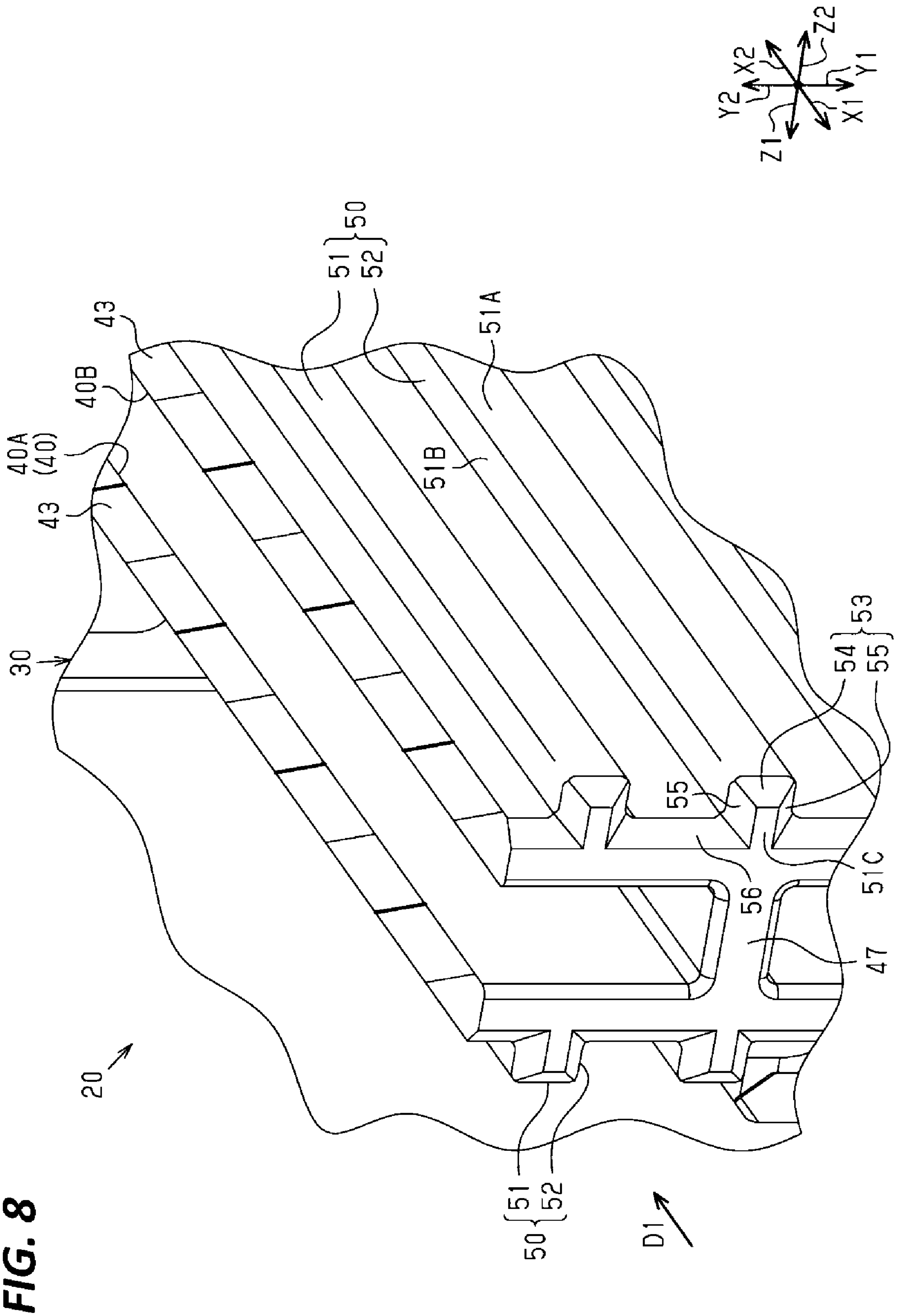
FIG. 8 is a schematic perspective view enlargedly showing a part of the first connector of the embodiment.

As shown in FIG. 8, a tip part of the (each) projection 51, i.e. an end part in the first direction X1 of each projection 51 particularly includes at least one guiding portion 53 particularly substantially formed into a tapered shape. The guiding portion 53 is, for example, formed to become narrower toward the end surface 51C of the projection 51. The guiding portion 53 is provided on or near a front side in the assembling direction D1. The guiding portion 53 particularly has at least one inclined surface 54 provided on the projecting end surface 51A and/or one or more inclined surfaces 55 provided on the respective side surfaces 51B.

The inclined surface 54 particularly is provided on the projecting end surface 51A on the tip part of the projection 51. The inclined surface 54 particularly substantially is inclined to approach the center axis of the projection 51 toward the end surface 51C of the projection 51. The inclined surface 54 substantially is inclined with respect to a plane orthogonal to the assembling direction D1.

Further, the inclined surface 54 particularly substantially is inclined with respect to a plane parallel to the assembling direction D1. The inclined surface 54 is, for example, formed by chamfering a corner part between the end surface 51C and the projecting end surface 51A. Chamfering may be R-chamfering or C-chamfering. The inclined surface 54 of this embodiment is formed by applying C-chamfering to the corner part between the end surface 51C and the projecting end surface 51A.

The inclined surface 55 is provided on the side surface 51B on or near the tip part of the projection 51. The inclined surface 55 particularly substantially is inclined to approach the center axis of the projection 51 toward the end surface 51C of the projection 51. The inclined surface 55 substantially is inclined with respect to a plane orthogonal to the assembling direction D1.

Further, the inclined surface 55 particularly substantially is inclined with respect to a plane parallel to the assembling direction D1. The inclined surface 55 is formed to expand an opening width along the second direction Y1 of the recess 52 in the tip part of the recess 52. The inclined surface 55 is, for example, formed by applying R-chamfering or C-chamfering to the corner part between the end surface 51C and the side surface 51B. The inclined surface 55 of this embodiment is formed by applying C-chamfering to the corner part between the end surface 51C and the side surface 51B.

The bottom surface of each recess 52 particularly has an inclined surface 56 provided in the tip part of the recess 52. The inclined surface 56 particularly substantially is inclined to approach the coupling wall 47 toward the tip surface of the side wall 43. The inclined surface 56 substantially is formed to expand an opening width along the third direction Z1 of the recess 52 in the tip part of the recess 52. The inclined surface 56 is inclined with respect to a plane orthogonal to the assembling direction D1.

Further, the inclined surface 56 particularly substantially is inclined with respect to a plane parallel to the assembling direction DE The inclined surface 56 is, for example, formed by applying R-chamfering or C-chamfering to a corner part between the tip surface of the side wall 43 and the bottom surface of the recess 52. The inclined surface 56 of this embodiment is formed by applying C-chamfering to the corner part between the tip surface of the side wall 43 and the bottom surface of the recess 52.

The guiding portion 53, i.e. the inclined surface(s) 54, 55 and/or 56, particularly has a function of guiding a projection 101 (see FIG. 12) of the second fitting portion 100 into the recess 52 when the second connector 70 is assembled with the first connector 20.

As shown in FIG. 5, a shortest distance L1 between the projecting end surface 51A of the projection 51 and the connection surface 24A of the first terminal 22 in a projecting direction of the projection 51 toward the first terminal 22, in particular, the third direction Z1 or third opposite direction Z2 is set as a first distance. Here, the first distance particularly is a distance in a range of about 3 mm or more and/or about 15 mm or less. In other words, the shortest distance L1 between the projecting end surface 51A and the connection surface 24A is, for example, set to a distance in the range of about 3 mm or more and about 15 mm or less in a cross-section including the projecting end surface 51A and the connection surface 24A and perpendicular to a center axis of the protecting portion 40. Note that the first distance is preferably a distance in a range of about 6 mm or more and/or about 12 mm or less, more preferably a distance in a range of about 6 mm or more and/or about 9 mm or less. By setting the shortest distance L1 as the first distance in this way, it can be suppressed that a worker's finger enters a clearance between the projection 51 and the first terminal 22. In this way, it can be suitably suppressed that the worker's finger contacts the connection surface 24A of the first terminal 22. Note that the shortest distance L1 is set to such a distance that the second terminal member 71 (see FIG. 1) provided in the second connector 70 is insertable.

Further, in the third direction Z1, a shortest distance L2 between the inner surface (third surface) of the side wall 44 and the non-connection surface 24B (second surface) of the first terminal 22 particularly is set to a distance equal to or shorter than the shortest distance L1 (L2≤L1). In other words, the shortest distance L2 between the inner surface of the side wall 44 and the non-connection surface 24B particularly is set to a distance equal to or shorter than the shortest distance L1 in the cross-section including the projecting end surface 51A and the connection surface 24A and perpendicular to the center axis of the protecting portion 40. By setting the shortest distance L2 in this way, it can be suitably suppressed that the worker's finger enters a clearance between the inner surface of the side wall 44 and the first terminal 22. In this way, it can be suitably suppressed that the worker's finger contacts the non-connection surface 24B of the first terminal 22. The shortest distance L2 of this embodiment is shorter than the shortest distance L1. That is, the first terminal member 21 is arranged closer to the side wall 44, out of the side walls 43, 44, in the third direction Z1 inside the protecting portion 40.

As shown in FIG. 3, the first connector housing 30 specifically includes one or more reinforcing portions 33 particularly coupling the side walls 43 having the first fitting portions 50 and the base portion 31. The reinforcing portion 33 is provided inside the (particularly each) protecting portion 40A, 40B.

The reinforcing portion 33 couples, for example, a base end part of the side wall 43, i.e. an end part in the first opposite direction X2 of the side wall 43, and the base portion 31 exposed in the protecting portion 40A, 40B.

The reinforcing portion 33 substantially extends in the second direction Y1. The reinforcing portion 33 is, for example, not coupled to the lower wall 45 and the upper wall 46. As shown in FIGS. 5 and 7, the reinforcing portion 33 extends in the first direction X1 from the base portion 31.

The reinforcing portion 33 particularly extends from the base portion 31 to an intermediate position in a length direction of the side wall 43 along the first direction X1. The base portion 33 has a specified (predetermined or predeterminable) thickness in the third direction Z1.

The reinforcing portion 33 particularly integrates the base end part of the side wall 43 and the base portion 31. By providing this reinforcing portion 33, the rigidity of the side wall 43 can be enhanced.

(Configuration of Slide Members 60)

As shown in FIG. 3, the (particularly each) slide member 60 is mounted in the (particularly each) protecting portion 40A, 40B.

The (particularly each) slide member 60 is slidable from a closing position (see FIG. 1) for substantially closing the second opening 42 to an opening position (see FIG. 3) in the first opposite direction X2. Here, the closing position for closing the second opening 42 only has to be a position where the second opening 42 can be closed to such an extent that a finger does not reach the first terminal 22 through the second opening 42, and the slide member 60 does not necessarily seal the second opening 42 at the closing position. Further, the opening position is a position for opening the second opening 42.

The slide member 60 is, for example, made of an insulating resin material.

(Configuration of Second Connector 70)

As shown in FIG. 1, the second connector 70 includes one or more (two in this embodiment) second terminal members 71 made of a conductive material such as metal and a second connector housing 80 for holding or positioning the second terminal member(s) 71.

In this embodiment, two second terminal members 71 are held in the second connector housing 80 while being substantially arranged along the third direction Z1.

The second connector housing 80 is attachable to and detachable from the first connector housing 30. Note that directions including the third direction Z1 in the second connector 70 are based on a state where the second connector 70 is connected to the first connector 20.

(Configuration of Second Terminal Members 71)

A tip part of each second terminal member 71 substantially extends in the second opposite direction Y2. The second terminal 71 is, for example, formed by press-working a metal plate material made of copper, copper alloy, aluminum, aluminum alloy or the like.

Figure 9:
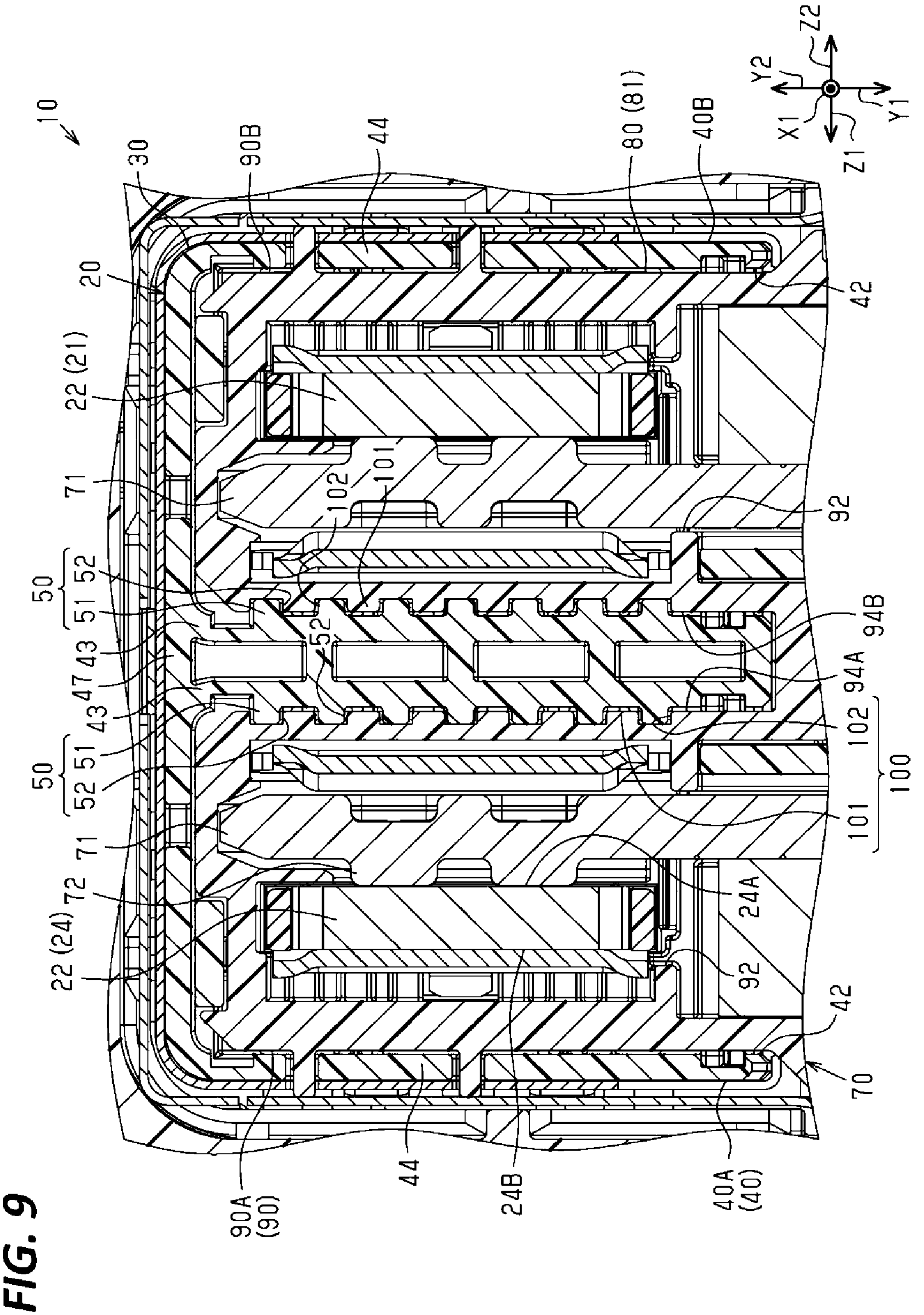
FIG. 9 is a schematic section (section along 9-9 in FIG. 2) enlargedly showing a part of the connector assembly of the embodiment.

As shown in FIG. 9, the plurality of second terminal members 71 are respectively provided to correspond to the plurality of first terminals 22. A tip part of each second terminal member 71 includes a connecting portion 72 to be connected to the connection surface 24A of each first terminal 22. The connecting portion 72 of each second terminal member 71 contacts and is electrically connected to the connection surface 24A of the first terminal 22 with the second connector 70 assembled with the first connector 20.

The second terminal members 71 particularly are arranged to pass through the second openings 42 of the protecting portions 40A, 40B with the second connector 70 connected to the first connector 20.

(Configuration of Second Connector Housing 80)

Figure 10:
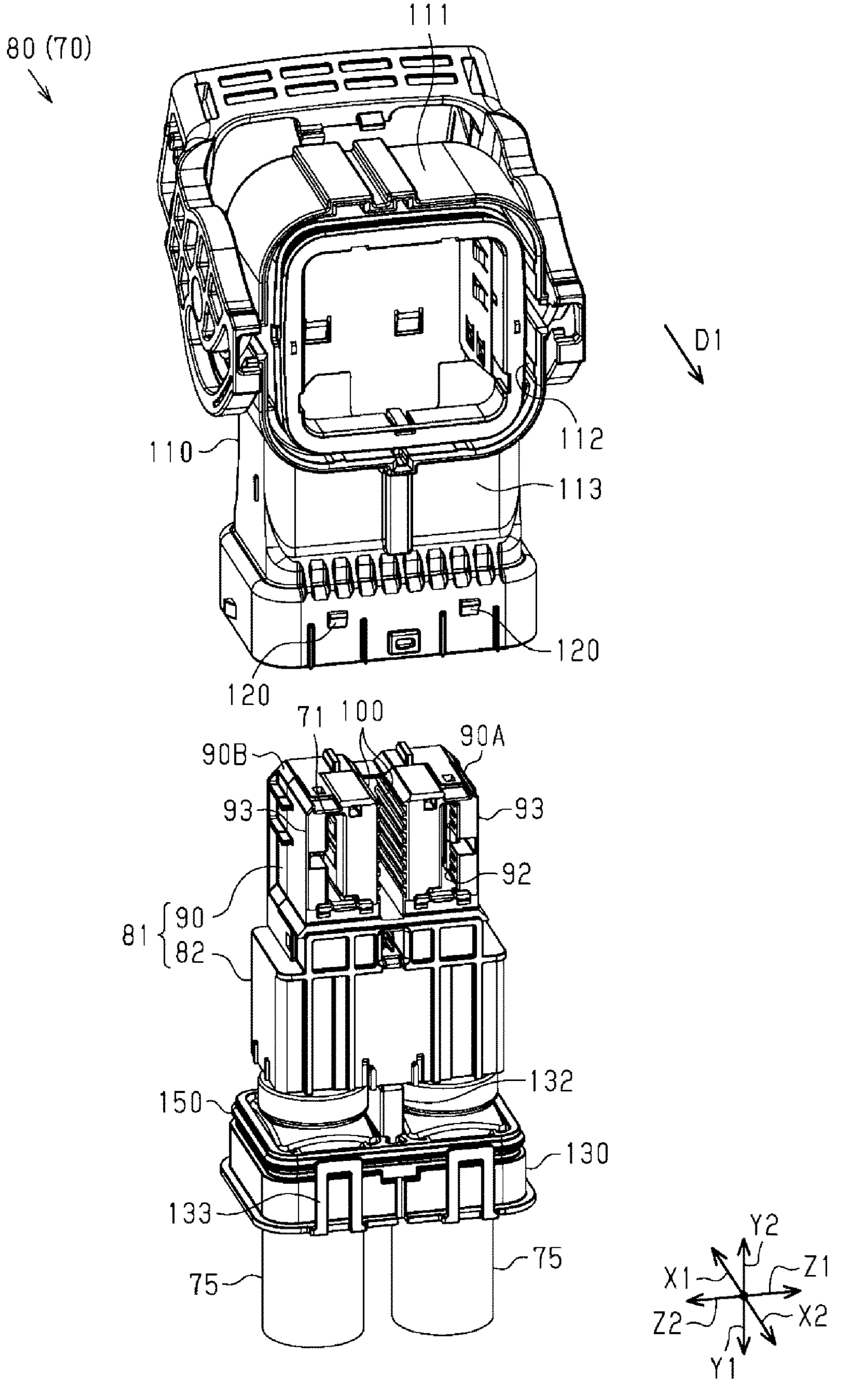
FIG. 10 is a schematic exploded perspective view showing a second connector of the embodiment.

As shown in FIG. 10, the second connector housing 80 includes an inner housing 81 for at least partly accommodating the one or more second terminal members 71 and an outer housing 110 for at least partly covering the inner housing 81. The inner housing 81 and the outer housing 110 are separate components.

(Configuration of Inner Housing 81)

The inner housing 81 includes, for example, a base portion 82 and/or a terminal accommodating portion 90 substantially projecting in the second opposite direction Y2 particularly from the base portion 82. The inner housing 81 is, for example, made of an insulating resin material.

Figure 11:
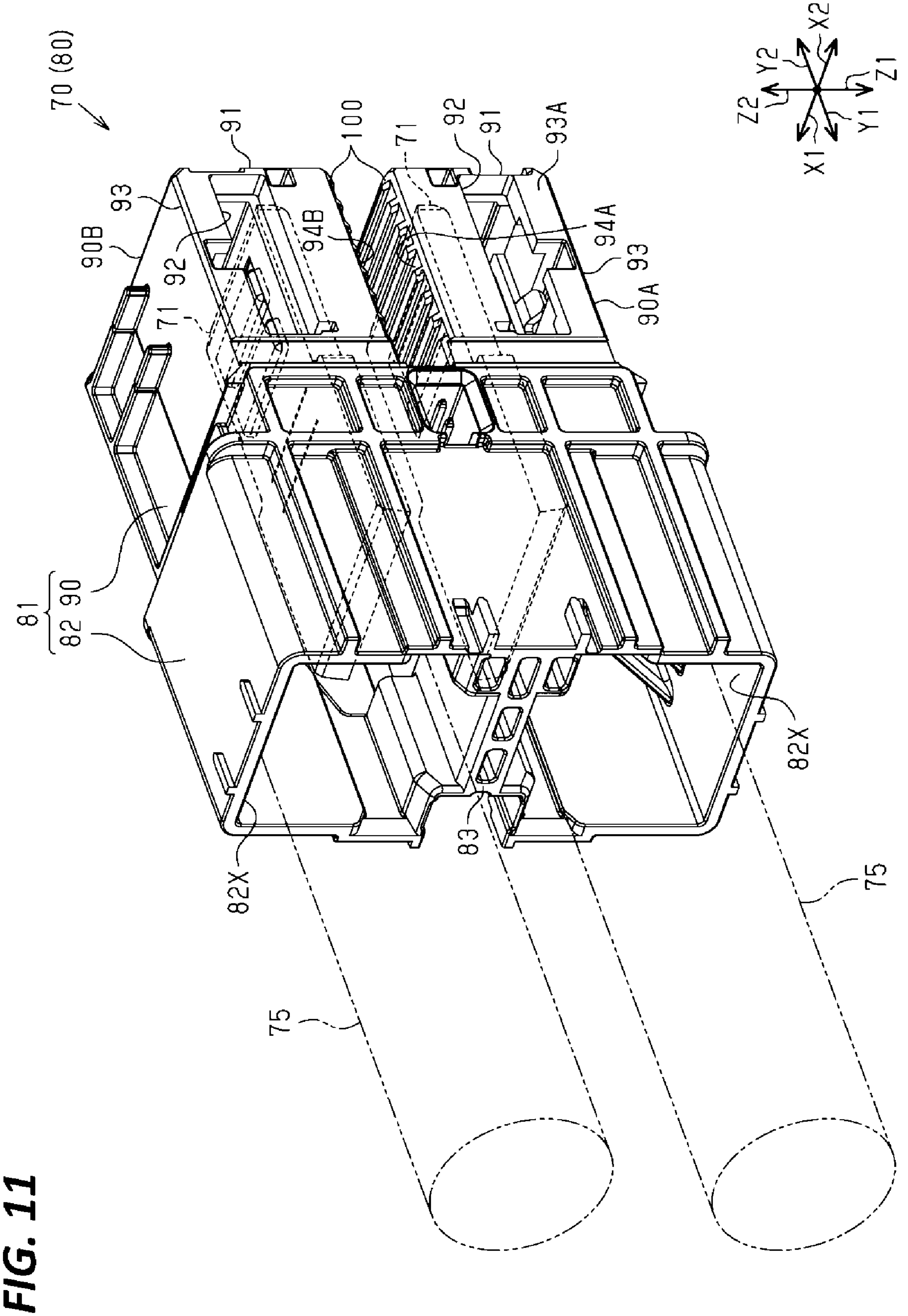
FIG. 11 is a schematic perspective view showing a part of the second connector of the embodiment.

As shown in FIG. 11, the base portion 82 particularly is provided on an end part in the second direction Y1 of the inner housing 81. The base portion 82 particularly substantially is formed into a ring shape.

The base portion 82 includes, for example, one or more through holes 82X through which one or more wires 75 to be electrically connected to the respective second terminal member(s) 71 are passed. Specifically, the base portion 82 includes two through holes 82X through which two wires 75 are individually passed. Each through hole 82X penetrates through the base portion 82 in the second direction Y1.

Specifically, the base portion 82 particularly includes a partition wall 83 at least partly partitioning the two through holes 82X. The partition wall 83 is provided between the two through holes 82X in the third direction Z1. The partition wall 83 is, for example, provided in a central part in the third direction Z1 of the base portion 82. The partition wall 83 substantially extends, for example, over the entire length of the base portion 82 in the second direction Y1.

Figure 12:
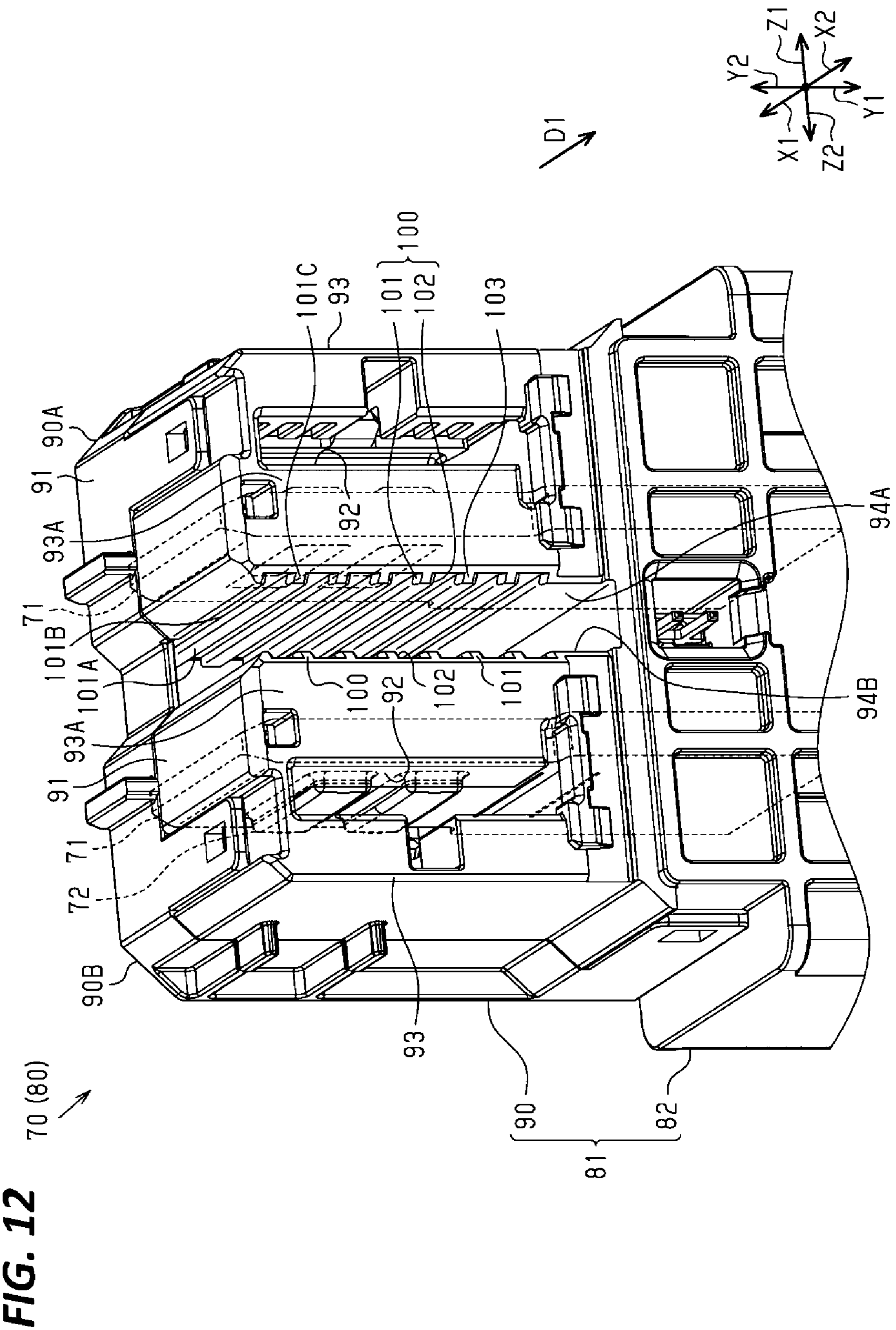
FIG. 12 is a schematic perspective view enlargedly showing a part of the second connector of the embodiment.

As shown in FIG. 12, the terminal accommodating portion 90 accommodates the two second terminal members 71. The terminal accommodating portion 90 includes, for example, two terminal accommodating portions 90A, 90B for individually accommodating the two second terminal members 71. The two terminal accommodating portions 90A, 90B particularly are commonly coupled to one base portion 82. In other words, the two terminal accommodating portions 90A, 90B are integrally or unitarily formed through the base portion 82.

Each terminal accommodating portion 90A, 90B substantially is, for example, in the form of a box extending along the second opposite direction Y2 from the base portion 82. In other words, each terminal accommodating portion 90A, 90B is in the form of a bottomed ring having a bottom wall 91. The bottom wall 91 particularly is constituted by a peripheral wall in the second opposite direction Y2 in the terminal accommodating portion 90A, 90B.

An internal space of each terminal accommodating portion 90A, 90B particularly communicates with the (particularly each) through hole 82X (see FIG. 11) of the base portion 82.

The second terminal member 71 at least partly is to be accommodated in the internal space of each terminal accommodating portion 90A, 90B. The (particularly each) terminal accommodating portion 90A, 90B includes an insertion hole 92 into which the first terminal member 21 of the first connector 20 at least partly is inserted.

Specifically, the (particularly each) insertion hole 92 is formed to penetrate through a peripheral wall 93 in the first opposite direction X2 of each terminal accommodating portion 90A, 90B. The (each) insertion hole 92 penetrates through the peripheral wall 93 along the first direction X1 parallel to the assembling direction D1. The (each) insertion hole 92 communicates with the internal space of each terminal accommodating portion 90A, 90B. The (each) terminal accommodating portion 90A, 90B holds the second terminal member 71 with the connecting portion 72 of each second terminal member 71 exposed in the internal space of each terminal accommodating portion 90A, 90B.

Further specifically, the two terminal accommodating portions 90A, 90B substantially are provided side by side along the third direction Z1. The two terminal accommodating portions 90A, 90B are provided away from each other in the third direction Z1. That is, a clearance is provided between the two terminal accommodating portions 90A, 90B.

The terminal accommodating portion 90A particularly has a facing surface 94A substantially facing the terminal accommodating portion 90B. The facing surface 94A is a surface in the third opposite direction Z2 in the terminal accommodating portion 90A. The terminal accommodating portion 90B has a facing surface 94B substantially facing the terminal accommodating portion 90A.

As shown in FIG. 6, the second connector housing 80 includes the one or more second fitting portions 100 to be convex-concavely fit or form fit to the first fitting portions 50 of the first connector 20.

Specifically, the second fitting portions 100 are to be engaged with the first fitting portions 50 in a direction intersecting the assembling direction D1. The second fitting portions 100 are provided in the inner housing 81.

As shown in FIG. 12, the one or more second fitting portions 100 are, for example, provided on the facing surface 94A of the terminal accommodating portion 90A and/or the facing surface 94B of the terminal accommodating portion 90B. That is, the second connector housing 80 of this embodiment specifically includes two second fitting portions 100.

As shown in FIG. 9, the (each) second fitting portion 100 includes one or more (six in this embodiment) projections 101 and one or more (seven in this embodiment) recesses 102. Specifically, in the (each) second fitting portion 100, the plural (e.g. six) projections 101 and the plural (e.g. seven) recesses 102 are alternately provided substantially side by side in the second direction Y1. The plural (six) projections 101 are to be respectively fit to the plural (six) recesses 52. The plural (seven) recesses 102 are to be respectively fit to the plural (seven) projections 51.

With the second connector 70 assembled with the first connector 20, the projections 51 of the first fitting portion 50 and the projections 101 of the second fitting portion 100 at least partly are engaged with each other in the second direction Y1.

With the second connector 70 connected to the first connector 20, the side walls 43 of the two protecting portions 40A, 40B and the coupling wall 47 at least partly are fit in a clearance between the facing surfaces 94A and 94B of the two terminal accommodating portions 90A, 90B. In this embodiment, the two second fitting portions 100 are convex-concavely fit to the two first fitting portions 50 provided on the two side walls 43 (particularly from both sides) in the third direction Z1 and/or the third opposite direction Z2.

Specifically, the second fitting portion 100 provided on the facing surface 94A is convex-concavely fit to the first fitting portion 50 provided on the side wall 43 of the protecting portion 40A, and/or the second fitting portion 100 provided on the facing surface 94B is convex-concavely fit to the first fitting portion 50 provided on the side wall 43 of the protecting portion 40B. In other words, in a condition in which the first and second connectors 20, 70 are properly mated, the projection(s) 51 on of the first fitting portion 50 are (particularly completely) inserted into the recess(es) 102 of the second fitting portion 100 and/or the projection(s) 101 of the second fitting portion 100 are (particularly completely) inserted or fitted into the recess(es) 52 of the first fitting portion 50 so that, as a result, the one or more first fitting portions 50 are convex-concavely fit to or form fit or mesh with the one or more respective second fitting portions 100 of the second connector 70.

More specifically, the one or more projections 101 (third projection) provided on the facing surface 94A are to be fit to the one or more recesses 52 (first recess) provided in the side wall 43 of the protecting portion 40A. Further, the one or more recesses 102 (second recess) provided in the facing surface 94A are to be fit to the projections 51 (first projection) provided on the side wall 43 of the protecting portion 40A.

Similarly, the one or more projections 101 (fourth projection) provided on the facing surface 94B are to be fit to the one or more recesses 52 provided in the side wall 43 of the protecting portion 40B. Further, the one or more projections 51 (second projection) provided on the side wall 43 of the protecting portion 40B are to be fit to the one or more recesses 102 provided in the facing surface 94B.

Thus, the two first fitting portions 50 of this embodiment particularly are sandwiched by the two second fitting portions 100 in the third direction Z1 so that, as a result, the first fitting portions 50 are convex-concavely fit to or form fit with or mesh with the second fitting portions 100 of the second connector 70 once the first and second connectors 20, 70 are properly mated or connected to each other.

The (each) projection 101 in one of the two second fitting portions 100 particularly projects toward the projection 101 in the other second fitting portion 100. For example, the (each) projection 101 provided on the facing surface 94A projects from the bottom surface of the (each) recess 102 provided in the facing surface 94A toward the facing surface 94B. For example, the (each) projection 101 provided on the facing surface 94B projects from the bottom surface of the (each) recess 102 provided in the facing surface 94B toward the facing surface 94A. For example, the (each) projection 101 substantially projects to extend along the third direction Z1 or third opposite direction Z2 from the bottom surface of the (each) recess 102.

As shown in FIG. 12, the (each) projection 101 substantially extends along the first direction Z1 from an end surface 93A in the first opposite direction X2 of the peripheral wall 93. An axial direction of each projection 101 in which a center axis of each projection 101 substantially extends is parallel to the first direction X1.

The (particularly each) projection 101 has a projecting end surface 101A, one or more (particularly a pair of) side surfaces 101B and/or an end surface 101C. The (each) projecting end surface 101A is an end surface provided at a position most distant from the bottom surface of the recess 102 in the third direction Z1, out of end surfaces of each projection 101.

The projecting end surface 101A in one of the two second fitting portions 100 substantially is facing the projecting end surface 101A in the other second fitting portion 100. The projecting end surface 101A particularly expands in the first direction X1 and expands in the second direction Y1. The (each) side surface 101B particularly expands in the first direction X1 and/or in the third direction Z1.

The (each) side surface 101B particularly constitutes the inner side surface of the recess 102. The end surface 101C is a surface in the first opposite direction X2 of the projection 101.

Specifically, the (each) recess 102 particularly is formed to be recessed from the projecting end surface 101A of the (each) projection 101. The (each) recess 102 substantially extends along the first direction X1 from the end surface 93A of the peripheral wall 93. The bottom surface of the (each) recess 102 in one of the two second fitting portions 100 is, for example, substantially facing the bottom surface of each recess 102 in the other second fitting portion 100. A tip part of the (each) recess 102, i.e. an end part in the first opposite direction X2 of each recess 102, substantially is open, for example, in the first opposite direction X2 parallel to the assembling direction D1.

Figure 13:
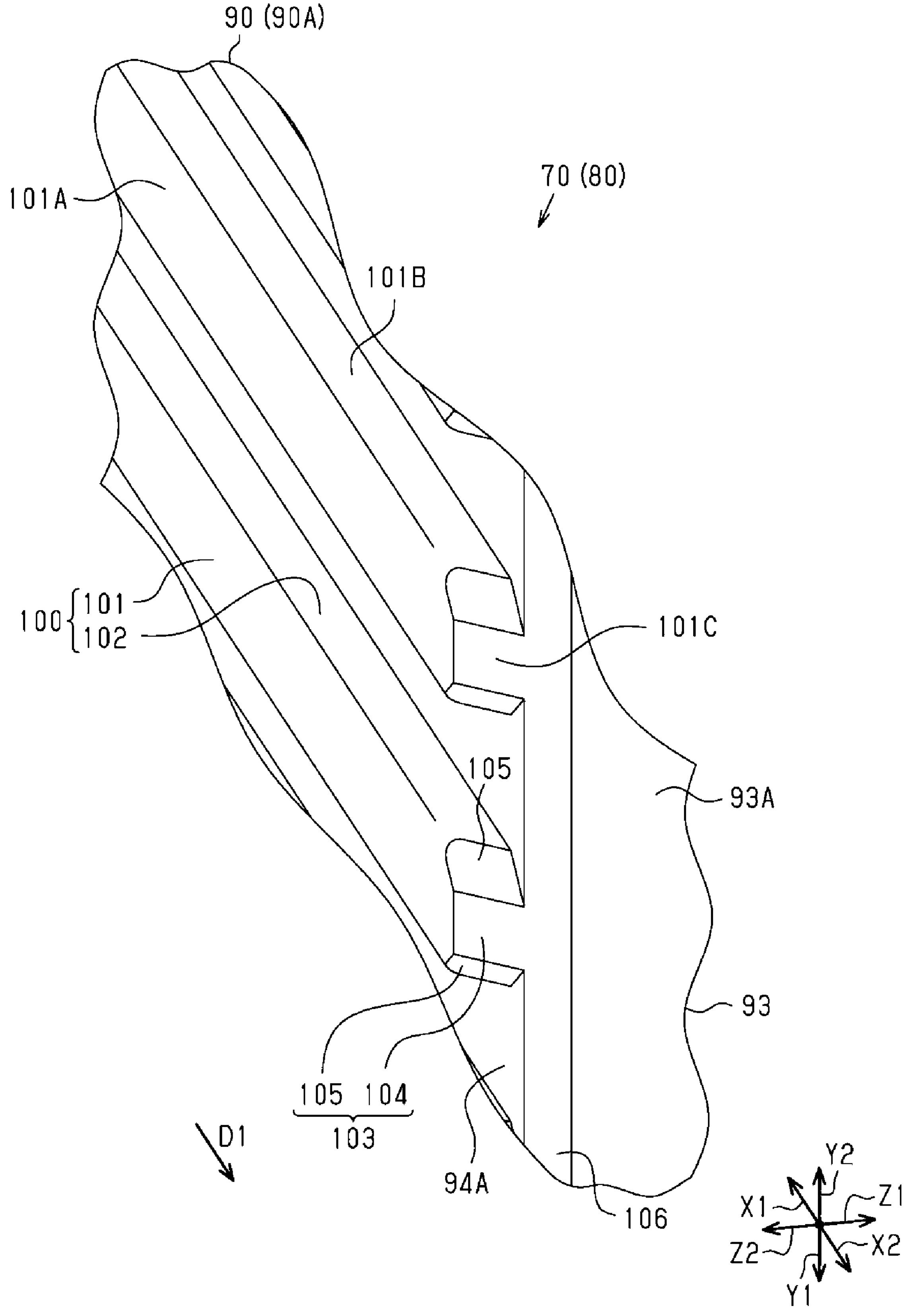
FIG. 13 is a schematic perspective view enlargedly showing a part of the second connector of the embodiment.

As shown in FIG. 13, a tip part of each projection 101, i.e. an end part in the first opposite direction X2 of each projection 101 particularly includes at least one guiding portion 103 particularly formed into a tapered shape. The (particularly each) guiding portion 103 is provided on an end part of the (each) projection 101 closest to the first connector 20 (see FIG. 6). The (each) guiding portion 103 is, for example, formed to become narrower toward the end surface 93A of the peripheral wall 93. Specifically, the (each) guiding portion 103 has at least one inclined surface 104 provided on the end surface 101C and/or one or more inclined surfaces 105 provided on the respective side surfaces 101B.

Specifically, the inclined surface 104 is inclined to approach the bottom surface of the recess 102 toward the end surface 93A of the peripheral wall 93. The inclined surface 104 particularly is provided on the entire end surface 101C. The inclined surface 104 particularly substantially is inclined with respect to a plane orthogonal to the assembling direction D1. Further, the inclined surface 104 particularly substantially is inclined with respect to a plane parallel to the assembling direction D1.

Particularly, the inclined surface 105 is provided on the side surface 101B on a tip part of the projection 101. The inclined surface 105 particularly substantially is inclined to approach a center axis of the projection 101 toward the end surface 101C of the projection 101. The inclined surface 105 particularly substantially is inclined with respect to a plane orthogonal to the assembling direction D1.

The inclined surface 105 particularly substantially is inclined with respect to a plane parallel to the assembling direction D1. The inclined surface 105 specifically is formed to expand an opening width along the second direction Y1 of the recess 102 in the tip part of the recess 102. The inclined surface 105 is, for example, formed by applying R-chamfering or C-chamfering to a corner part between the end surface 101C and the side surface 101B. The inclined surface 105 of this embodiment is formed by applying C-chamfering to the corner part between the end surface 101C and the side surface 101B.

The bottom surface of the (each) recess 102 particularly has an inclined surface 106 provided in the tip part of the recess 102. The inclined surface 106 particularly substantially is inclined to be separated from the projecting end surface 101A toward the end surface 93A of the peripheral wall 93. The inclined surface 106 particularly substantially is formed to expand an opening width along the third direction Z1 of the recess 102 in the tip part of the recess 102. The inclined surface 106 is inclined with respect to a plane orthogonal to the assembling direction D1. The inclined surface 106 particularly substantially is inclined with respect to a plane parallel to the assembling direction D1.

The inclined surface 106 is, for example, formed by applying R-chamfering or C-chamfering to a corner part between the end surface 93A of the peripheral wall 93 and the bottom surface of the recess 102. The inclined surface 106 of this embodiment is formed by applying C-chamfering to the corner part between the end surface 93A of the peripheral wall 93 and the bottom surface of the recess 102. A part of the inclined surface 106 is, for example, continuously and integrally or unitarily formed to the inclined surface 104.

The guiding portion 103, i.e. the inclined surface(s) 104, 105 and/or 106, has a function of guiding the projection 51 (see FIG. 7) of the first fitting portion 50 into the recess 102 when the second connector 70 is assembled with the first connector 20.

(Configuration of Outer Housing 11)

Figure 14:
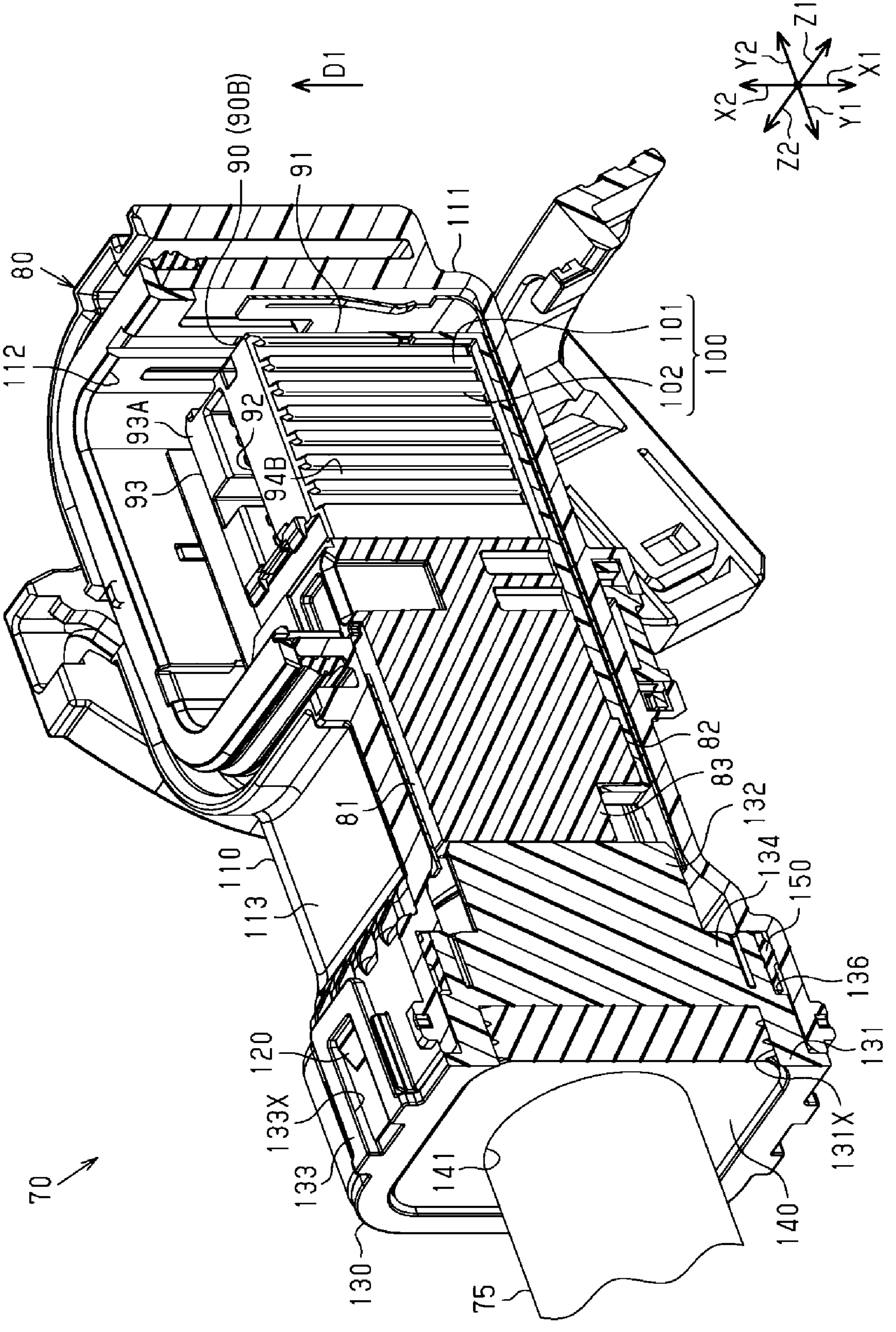
FIG. 14 is a schematic perspective view partly in section showing the second connector of the embodiment.

As shown in FIGS. 10 and 14, the outer housing 110 at least partly surrounds the outer periphery of the inner housing 81. In other words, the inner housing 81 at least partly is accommodated inside the outer housing 110.

Specifically, the outer housing 110 substantially is in the form of a bottomed ring having a bottom wall 111. For example, the outer housing 110 is in the form of a bottomed ring open in the second direction Y1 and having an opening in the second opposite direction Y2 closed by the bottom wall 111.

The outer housing 110 includes an opening 112 for at least partly exposing the peripheral walls 93 of the terminal accommodating portions 90A, 90B. The opening 112 particularly is provided in a peripheral wall 113 in the first opposite direction X2 of the outer housing 110. The opening 112 particularly is provided on an end part in the second opposite direction Y2 of the peripheral wall 113, i.e. an end part of the peripheral wall 113 on the side of the bottom wall 111. The opening 112 particularly penetrates through the peripheral wall 113 substantially along the first direction X1 parallel to the assembling direction D1. The opening 112 particularly communicates with an internal space of the outer housing 110.

One or more (four in this embodiment) engaging portions 120 are provided on the outer peripheral surface of the outer housing 110. The one or more engaging portions 120 are, for example, provided on the outer surface of the peripheral wall 113 on an end part in the second direction Y1.

As shown in FIG. 10, one or more (two) engaging portions 120 are provided on the outer surface of the peripheral wall 113 on the end part in the second direction Y1. The one or more (two) engaging portions 120 are, for example, provided away from each other in the third direction Z1. The (each) engaging portion 120 is, for example, formed to project radially outwardly of the outer housing 110 from the outer surface of the peripheral wall 113. As shown in FIG. 1, two engaging portions 120 are similarly provided on a peripheral wall in the first direction X1 of the outer housing 110.

(Configuration of Second Connector 70)

As shown in FIG. 14, the second connector 70 includes, for example, an inner member 130 for supporting the inner housing 81. The second connector 70 includes, for example, one or more (two in this embodiment) annular sealing members 140 to be fit inside the inner member 130 and/or at least one annular sealing member 150 to be externally fit on the inner member 130.

(Configuration of Inner Member 130)

The inner member 130 is to be mounted on an end part in the second direction Y1 of the outer housing 110. The inner member 130 is, for example, a component separate from the inner housing 81. The inner member 130 is, for example, a component separate from the outer housing 110. A part of the inner member 130 particularly is to be accommodated inside the outer housing 110.

The inner member 130 particularly supports the inner housing 81 inside the outer housing 110. The inner member 130 supports the inner housing 81, for example, by pressing the inner housing 81 toward the inner surface of the bottom wall 111 inside the outer housing 110.

Figure 15:
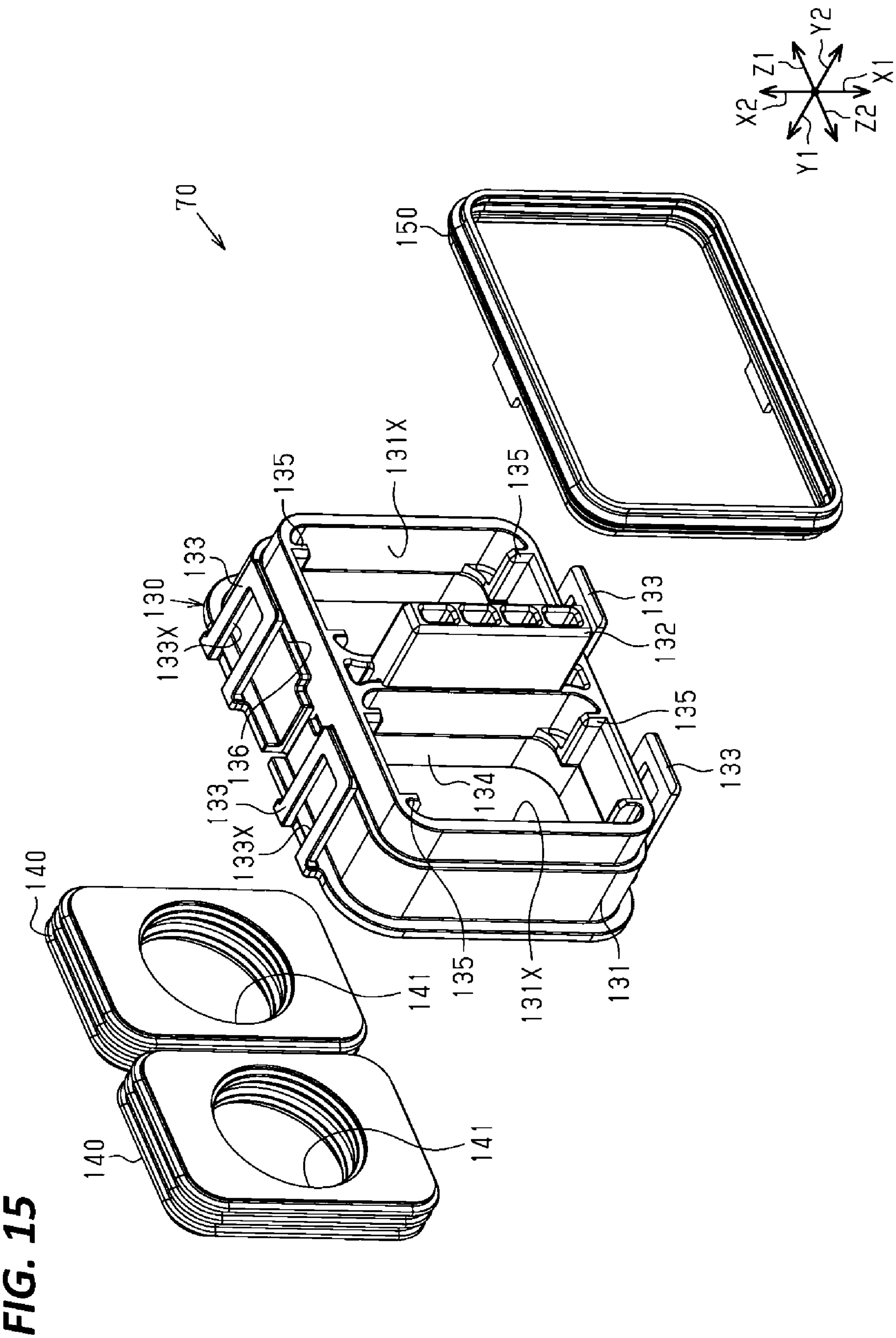
FIG. 15 is a schematic exploded perspective view showing a part of the second connector of the embodiment.

As shown in FIG. 15, the inner member 130 includes at least one body portion 131, at least one projecting portion 132 substantially projecting in the second opposite direction Y2 from an end surface in the second opposite direction Y2 of the body portion 131, and/or one or more (four in this embodiment) engaging portions 133. The inner member 130 is, for example, a single component in which the body portion 131, the projecting portion 132 and the engaging portions 133 are integrally or unitarily formed. The inner member 130 is, for example, made of an insulating resin material.

The body portion 131 particularly is formed into a ring shape. The body portion 131 particularly is in the form of a rectangular ring as a whole. The body portion 131 includes, for example, one or more (e.g. two) through holes 131X through which the one or more (e.g. two) wires 75 (see FIG. 10) are individually passed. One or more (e.g. two) sealing members 140 are individually fit into the respective one or more (two) through holes 131X. Each through hole 131X penetrates through the body portion 131 in the second direction Y1. The (each) through hole 131X is, for example, formed to have a rectangular plan view shape when viewed from a penetration direction of the through hole 131X.

The body portion 131 includes at least one partition wall 134 at least partly partitioning the plurality of (two) through holes 131X. The partition wall 134 is provided between the adjacent (two) through holes 131X in the third direction Z1.

The partition wall 134 is, for example, provided in a central part in the third direction Z1 of the body portion 131. The partition wall 134 extends, for example, over the entire length in the second direction Y1 of the body portion 131.

The body portion 131 includes one or more (four in this embodiment) restricting walls 135 provided on the inner peripheral surface of the (each) through hole 131X. The (each) restricting wall 135 is formed to project radially inwardly of the through hole 131X from the inner peripheral surface of the through hole 131X in an end part in the second opposite direction Y2. For example, each restricting wall 135 substantially extends from a central or intermediate part in the second direction Y1 of the body portion 131 to or towards an end surface in the second opposite direction Y2 of the body portion 131.

At least one groove portion 136 into which the sealing member 150 is mounted particularly is provided in the outer peripheral surface of the body portion 131. The groove portion 136 specifically is provided in the outer peripheral surface of the body portion 131 on the end part in the second opposite direction Y2. The groove portion 136 particularly substantially is formed to be recessed radially inwardly of the body portion 131 from the outer peripheral surface of the body portion 131. The groove portion 136 particularly is continuously formed over the entire periphery in a circumferential direction of the body portion 131. The groove portion 136 substantially extends, for example, from the central or intermediate part in the second direction Y1 of the body portion 131 to or towards the end surface in the second opposite direction Y2 of the body portion 131.

The projecting portion 132 projects, for example, in the second opposite direction Y2 from an end surface in the second opposite direction Y2 of the partition wall 134. For example, the projecting portion 132 extends in the first direction X1 and/or has a specified (predetermined or predetermined) thickness in the third direction Z1.

As shown in FIG. 14, the projecting portion 132 at least partly contacts the partition wall 83 of the base portion 82 when the inner member 130 is mounted on the outer housing 110. The tip surface of the projecting portion 132, i.e. an end surface in the second opposite direction Y2 of the projecting portion 132, particularly contacts an end surface in the second direction Y1 of the partition wall 83. The projecting portion 132 particularly supports the inner housing 81 inside the outer housing 110, for example, by contacting the partition wall 83 and pressing the inner housing 81 toward the bottom wall 111.

One or more (e.g. four) engaging portions 133 are provided to correspond to the one or more (e.g. four) engaging portions 120 of the outer housing 110. The (each) engaging portion 133 is, for example, formed to project in the second opposite direction Y2 from an end part in the second direction Y1 of the body portion 131. The (each) engaging portion 133 is provided away from the outer peripheral surface of the body portion 131 in the first direction X1. The (each) engaging portion 133 is in the form of a cantilever having a base end part connected to the body portion 131 as a fixed end and a tip part on a side opposite to the base end part in the second direction Y1 as a free end. The (each) engaging portion 133 is configured to be deflectable in the first direction X1 by being resiliently deformed. The (each) engaging portion 133 includes an engaging hole 133X, with which the engaging portion 120 is engaged. The engaging hole 133X extends, for example, in the second direction Y1. The engaging portions 133, 120 are engaged with each other, for example, by a snap-fit method. By engaging the engaging portions 133 and 120 with each other, the inner member 130 is fixed to the outer housing 110.

(Configuration of Sealing Members 140, 150)

The two sealing members 140 are respectively provided to correspond to the two wires 75. The two sealing members 140 are respectively mounted on the outer peripheral surfaces of the two wires 75. The (each) sealing member 140 is fit inside each through hole 131X. The (each) sealing member 140 particularly is in the form of a ring having an outer peripheral surface along the inner peripheral surface of the through hole 131X. The (each) sealing member 140 particularly includes a through hole 141 through which the (each) wire 75 is passed. The inner peripheral surface of the through hole 141 particularly substantially is shaped in conformity with the outer peripheral surface of the wire 75. The (each) sealing member 140 particularly is configured to be resiliently deformable. The (each) sealing member 140 is, for example, held in close contact with the outer peripheral surface of the wire 75 and the inner peripheral surface of the through hole 131X. The (each) sealing member 140 particularly seals between the outer peripheral surface of the wire 75 and the inner peripheral surface of the inner member 130. Note that an end surface in the second opposite direction Y2 of the (each) sealing member 140 is in contact with the restricting walls 135 shown in FIG. 15 inside the through hole 131X. By the contact of the (each) sealing member 140 with the restricting walls 135, an insertion amount of the (each) sealing member 140 into the (each) through hole 131X particularly is restricted. In other words, the restricting walls 135 function to position the (each) sealing member 140 inside the (each) through hole 131X.

As shown in FIG. 14, the sealing member 150 particularly is to be mounted on the outer peripheral surface of the inner member 130. The sealing member 150 is, for example, mounted on the bottom surface of the groove portion 136 of the body portion 131. The sealing member 150 particularly is provided inside the outer housing 110. The sealing member 150 particularly is in the form of a ring continuous over the entire periphery in a circumferential direction of the inner member 130.

The outer peripheral surface of the sealing member 150 particularly substantially is shaped in conformity with the inner peripheral surface of the outer housing 110. The inner peripheral surface of the sealing member 150 particularly substantially is shaped in conformity with the outer peripheral surface of the inner member 130.

The sealing member 150 particularly is configured to be resiliently deformable. The sealing member 150 is, for example, to be held in close contact with the outer peripheral surface of the inner member 130 and the inner peripheral surface of the outer housing 110. The sealing member 150 particularly seals between the outer peripheral surface of the inner member 130 and the inner peripheral surface of the outer housing 110.

The sealing members 140, 150 are, for example, made of rubber. For example, nitrile rubber, silicone rubber, urethane rubber, acrylic rubber, butyl rubber, ethylene propylene rubber and the like can be used as a material of the sealing members 140, 150.

Next, functions and effects of this embodiment are described.

(1) The first connector housing 30 particularly includes the one or more first fitting portions 50 to be convex-concavely fit to the one or more second fitting portions 100 provided in the mating second connector 70 and engaged with the second fitting portion(s) 100 in the second direction Y1 intersecting the assembling direction D1 of the first and second connectors 20, 70. By engaging the first fitting portion(s) 50 with the second fitting portion(s) 100, a movement of the first connector housing 30 in the second direction Y1 is restricted. Thus, even if vibration is applied to the first connector 20 assembled with the second connector 70, a relative movement of the first connector housing 30 with respect to the second connector 70 can be restricted in the second direction Y1. In this way, it is possible to suppress or reduce a relative movement of the first terminal member(s) 21 held in the first connector housing 30 with respect to the second terminal member(s) 71 provided in the second connector 70. As a result, the wear of contact points between the first terminal member(s) 21 and the second terminal member(s) 71 can be suitably suppressed.

(2) The first fitting portion 50 particularly includes the one or more projections 51 substantially extending along the third direction Z1 from the inner surface of the side wall 43 and projecting toward the first terminal member 21. The first terminal member 21 particularly has the connection surface 24A substantially facing the projections 51 in the third direction Z1. The shortest distance L1 between the projecting end surface(s) 51A of the projection(s) 51 and the connection surface 24A of the first terminal member 21 in the third direction Z1 is set as the first distance. Here, the first distance particularly is a distance in the range of about 3 mm or more and about 15 mm or less. The first distance is preferably a distance in the range of about 6 mm or more and about 12 mm or less, more preferably a distance in the range of about 6 mm or more and about 9 mm or less. By setting the shortest distance L1 as the first distance, it can be suppressed that the worker's finger enters the clearance between the tips of the projections 51 and the connection surface 24A of the first terminal member 21. Thus, it can be suppressed that the worker's finger contacts the connection surface 24A of the first terminal member 21 through the clearance between the tips of the projection(s) 51 and the connection surface 24A of the first terminal member 21. In this way, the wear of the contact point can be suppressed while a measure for preventing an electric shock is taken.

(3) The first connector housing 30 particularly includes the side wall 44 provided on the side opposite to the side wall 43 provided with the first fitting portion 50 across the first terminal member 21 in the third direction Z1. The shortest distance L2 between the inner surface (third surface) of the side wall 44 and the non-connection surface 24B (second surface) of the first terminal member 21 in the third direction Z1 particularly is set equal to or shorter than the shortest distance L1, i.e. equal to or shorter than the first distance. In this way, it can be suppressed that the worker's finger enters the clearance between the inner surface of the side wall 44 and the non-connection surface 24B of the first terminal member 21. Thus, it can be suppressed that the worker's finger contacts the first terminal member 21 through the clearance between the inner surface of the side wall 44 and the non-connection surface 24B of the first terminal member 21.

(4) The first fitting portions 50 particularly are provided on the side walls 43 provided between the plurality of first terminal members 21. Thus, the first fitting portions 50 can be provided near the plurality of first terminal members 21. Therefore, relative movements of the first terminal members 21 provided near the first fitting portions 50 can be suitably suppressed.

(5) The first and second fitting portions 50, 100 particularly are engaged with each other in the second direction Y1 in which the second openings 42 of the protecting portion 40 are open. Here, in the case of including the second openings 42 open in the second direction Y1 intersecting the assembling direction D1, the first connector housing 30 easily relatively moves with respect to the second connector 70 in the second direction Y1 when the second connector 70 is assembled with the first connector 20. In view of this, the first fitting portion(s) 50 are engaged with the second fitting portion(s) 100 in the second direction Y1 in the above configuration, wherefore a relative movement of the first connector housing 30 with respect to the second connector 70 can be suitably suppressed in the second direction Y1.

(6) The first fitting portion 50 particularly is provided on the inner surface of the side wall 43 constituting the protecting portion 40 surrounding the outer periphery of the first terminal member 21. Thus, the first fitting portion 50 can be provided near the first terminal member 21. Therefore, a relative movement of the first terminal member 21 provided near the first fitting portion 50 can be suitably suppressed.

(7) The protecting portion 40 particularly includes the two protecting portions 40A, 40B for individually protecting the two first terminal members 21. Further, the first fitting portions 50 include the one or more projections 51 (first projection) provided on the protecting portion 40A and the one or more projections 51 (second projection) provided on the protecting portion 40B. In other words, the first fitting portions 50 particularly are provided on both of the two protecting portions 40A, 40B. Thus, the first fitting portion 50 can be provided near each of the two first terminal members 21. Therefore, relative movements of the two first terminal members 21 can be suitably suppressed.

(8) The first fitting portion 50 particularly includes the one or more projections 51 and the one or more recesses 52 recessed from the projecting end surface(s) 51A of the projection(s) 51. The projection 51 particularly has the one or more inclined surfaces 54, 55 (first inclined surface) for guiding the projection 101 of the second fitting portion 100 of the second connector 70 into the recess 52 when the second connector 70 is assembled with the first connector 20. Thus, when the second connector 70 is assembled with the first connector 20, the first and second fitting portions 50, 100 can be easily convex-concavely fit. In this way, the second connector 70 can be easily assembled with the first connector 20.

(9) The recess 52 particularly has the inclined surface 56 (second inclined surface) for guiding the projection 101 of the second fitting portion 100 of the second connector 70 into the recess 52 when the second connector 70 is assembled with the first connector 20. Thus, when the second connector 70 is assembled with the first connector 20, the first and second fitting portions 50, 100 can be easily convex-concavely fit. In this way, the second connector 70 can be easily assembled with the first connector 20.

(10) The first connector housing 30 particularly includes the one or more reinforcing portions 33 coupling the base portion 31 and the base end part(s) of the side wall(s) 43 provided with the first fitting portion(s) 50. Thus, as compared to a configuration not including the reinforcing portion(s) 33, swinging movements of the side walls 43 can be suppressed when vibration is applied to the first connector 20. In this way, a relative movement of the first connector housing 30 can be suppressed and, consequently, relative movements of the first terminal members 21 can be suppressed.

(11) The second connector 70 particularly includes the one or more second fitting portions 100 to be convex-concavely fit to the one or more first fitting portions 50 provided in the mating first connector 20 and engaged with the one or more first fitting portions 50 in the second direction Y1 intersecting the assembling direction D1 of the first and second connectors 20, 70. The one or more second fitting portions 100 particularly are provided in the inner housing 81 for at least partly accommodating the second terminal members 71. By engaging the second fitting portion(s) 100 with the first fitting portion(s) 100, a movement of the inner housing 81 in the second direction Y1 is restricted. Thus, even if vibration is applied to the second connector 70 assembled with the first connector 20, a relative movement of the inner housing 81 with respect to the first connector 20 can be suppressed in the second direction Y1. In this way, it is possible to suppress relative movements of the second terminal member(s) 71 held in the inner housing 81 with respect to the first terminal member(s) 21 provided in the first connector 20. As a result, the wear of the contact points between the first terminal members 21 and the second terminal members 71 can be suitably suppressed.

(12) The inner housing 81 particularly includes the base portion 82 and the terminal accommodating portion 90 extending from the base portion 82. The second fitting portions 100 particularly are provided on the outer surface of the terminal accommodating portion 90 for at least partly accommodating the second terminal members 71 inside, out of the inner housing 81. Thus, the second fitting portion(s) 100 can be provided near the second terminal member(s) 71. Therefore, relative movements of the second terminal member(s) 71 provided near the second fitting portion(s) 100 can be suitably suppressed.

(13) The terminal accommodating portion 90 particularly includes the one or more terminal accommodating portions 90A, 90B for individually accommodating the one or more (e.g. two) second terminal members 71. The terminal accommodating portion 90A particularly has the facing surface 94A facing the terminal accommodating portion 90B in the third direction Z1, and the terminal accommodating portion 90B particularly has the facing surface 94B facing the facing surface 94A. The one or more second fitting portions 100 particularly include the one or more projections 101 (third projection) provided on the facing surface 94B and the one or more projections 101 (fourth projection) provided on the facing surface 94B. In other words, the second fitting portions 100 particularly are provided on both of the two terminal accommodating portions 90A, 90B. Thus, the second fitting portion(s) 100 can be provided near the second terminal member(s) 71 accommodated in the respective terminal accommodating portion(s) 90A, 90B. Therefore, relative movements of the second terminal member(s) 71 provided near the second fitting portion(s) 100 can be suitably suppressed.

(14) The one or more projections 101 (third projection) provided on the facing surface 94A and the one or more projections 101 (fourth projection) provided on the facing surface 94B particularly are provided to substantially face each other in the third direction Z1. Thus, when the second connector 70 is assembled with the first connector 20, the (e.g. two) first fitting portions 50 of the first connector 20 are sandwiched from both sides in the third direction Z1 by the (e.g. two) second fitting portions 100. Therefore, the two second fitting portions 100 specifically are convex-concavely fit or form-fit to the two first fitting portions 50 from both sides in the third direction Z1. In this way, movements of the first connector housing 30 and the inner housing 81 in the second direction Y1 and the third direction Z1 can be suitably suppressed. As a result, relative movements of the first connector housing 30 and the inner housing 81 can be more suitably suppressed and relative movements of the first and second terminal members 21, 71 can be more suitably suppressed.

(15) The second fitting portion 100 provided on the facing surface 94A particularly includes the one or more projections 101 (third projection) and the one or more recesses 102 (second recess) recessed toward the facing surface 94A from the projecting end surface(s) 101A of the projection(s) 101. Similarly, the second fitting portion 100 provided on the facing surface 94B particularly includes the one or more projections 101 and the one or more recesses 102 recessed toward the facing surface 94B from the projecting end surface(s) 101A of the projection(s) 101. The (particularly each) projection 101 particularly has the inclined surfaces 104, 105 (third inclined surface) for guiding the projection 51 of the first fitting portion 50 of the first connector 20 into the recess 102 when the second connector 70 is assembled with the first connector 20. Thus, when the second connector 70 is assembled with the first connector 20, the first and second fitting portions 50, 100 can be easily convex-concavely fit or form-fit. In this way, the second connector 70 can be easily assembled with the first connector 20.

(16) The recess 102 particularly has the at least one inclined surface 106 (fourth inclined surface) for guiding the projection 51 of the first fitting portion 50 of the first connector 20 into the recess 102 when the second connector 70 is assembled with the first connector 20. Thus, when the second connector 70 is assembled with the first connector 20, the first and second fitting portions 50, 100 can be easily convex-concavely fit or form-fit. In this way, the second connector 70 can be easily assembled with the first connector 20.

(17) The second connector 70 particularly includes the inner member 130 for supporting the inner housing 81 inside the outer housing 110. Thus, as compared to a configuration not including the inner member 130, it can be suppressed that the inner housing 81 swings inside the outer housing 110 when vibration is applied to the second connector 70. In this way, a relative movement of the inner housing 81 can be suppressed and, consequently, relative movements of the second terminal members 71 can be suppressed.

(18) The terminal accommodating portions 90A, 90B particularly are integrally or unitarily formed through the base portion 82. Thus, the number of components can be reduced as compared to the case where the terminal accommodating portions 90A, 90B are configured as separate components. Further, the both terminal accommodating portions 90A, 90B can be supported by the contact of the inner member 130 with the base portion 82. Thus, the structure of the inner member 130 can be simplified as compared to the case where structures for supporting the terminal accommodating portions 90A, 90B are individually provided.

Accordingly, in order to suppress the wear of contact points, there is provided a first connector 20 attachable to and detachable from a second connector 70 which includes one or more, particularly a plurality of first terminal members 21 having tip parts substantially extending in a first direction X1, and a first connector housing 30 for holding or positioning the plurality of first terminal members 21. The first connector housing 30 includes one or more side walls 43 having tip parts extending in the first direction X1. The side wall 43 includes a first fitting portion 50 to be convex-concavely fit or form-fit to a second fitting portion 100 provided in the second connector 70. The first fitting portion 50 is engaged with the second fitting portion 100 in a second direction Y1 intersecting an assembling direction D1 of the first and second connectors 20, 70.

OTHER EMBODIMENTS

The above embodiment can be modified and carried out as follows. The above embodiment and the following modifications can be carried out in combination without technically contradicting each other.

Although the projection 51 of the above embodiment particularly has the inclined surfaces 54, 55, there is no limitation to this. For example, the projection 51 may not have the inclined surface 54. For example, the projection 51 may not have the inclined surfaces 55. For example, the projection 51 may have none of the inclined surfaces 54, 55.

Although the recess 52 of the above embodiment particularly has the inclined surface 56, there is no limitation to this. For example, the recess 52 may not have the inclined surface 56.

The numbers of the projections 51 and the recesses 52 in the first fitting portion 50 of the above embodiment are not particularly limited. For example, the first fitting portion 50 may be configured to include only one projection 51.

The number of the first fitting portions 50 of the above embodiment is not limited to two and may be changed to one, three or more.

Although the first fitting portions 50 particularly are provided on the side walls 43 provided between the plurality of first terminal members 21, out of the protecting portion 40, in the first connector housing 30 of the above embodiment, there is no limitation to this.

For example, the first fitting portions 50 may be provided on the side walls 44 of the protecting portion 40. In this case, the first fitting portions 50 may be provided on the inner surfaces of the side walls 44 or may be provided on the outer surfaces of the side walls 44.

For example, the first fitting portions 50 may be provided on the upper walls 46 of the protecting portion 40. In this case, the first fitting portions 50 may be provided on the inner surfaces of the upper walls 46 or may be provided on the outer surfaces of the upper walls 46.

Although the first fitting portions 50 particularly are provided on the peripheral walls constituting the protecting portion 40, out of walls having the tip parts extending in the first direction X1, in the first connector housing 30 of the above embodiment, there is no limitation to this. For example, the first fitting portions 50 may be provided on the peripheral wall portion 32.

Although the side wall 43 of the protecting portion 40A and the side wall 43 of the protecting portion 40B particularly are integrally formed via the coupling wall 47 in the protecting portions 40, there is no limitation to this. For example, the coupling wall 47 may be omitted from the protecting portion 40 so that the side wall 43 of the protecting portion 40A and the side wall 43 of the protecting portion 40B are not integrated.

Although the protecting portion 40 particularly is configured to include the one or more second openings 42 open in the second direction Y1 in the above embodiment, there is no limitation to this. The protecting portion 40 may be configured not to include the second openings 42. The protecting portion 40 in this case particularly surrounds the first terminal members 21 over the entire periphery in the directions orthogonal to the first direction X1, and is open only in the first direction X1 by having the first openings 41. In this case, the slide members 60 are omitted.

The reinforcing portions 33 in the first connector housing 30 of the above embodiment may be omitted.

Although the first terminal member 21 of the above embodiment is configured to include the first terminal 22 and the protecting member 25, there is no limitation to this. For example, the first terminal member 21 may be configured not to include the protecting member 25, i.e. configured to include only the first terminal 22.

Although the projection 101 of the above embodiment particularly is configured to have the one or more inclined surfaces 104, 105, there is no limitation to this. For example, the projection 101 may be configured not to have the inclined surface 104. For example, the projection 101 may be configured not to have the inclined surfaces 105. For example, the projection 101 may be configured to have none of the inclined surfaces 104, 105.

Although the recess 102 of the above embodiment particularly is configured to have the inclined surface 106, there is no limitation to this. For example, the recess 102 may be configured not to have the inclined surface 106.

The numbers of the projections 101 and the recesses 102 in the second fitting portion 100 of the above embodiment are not particularly limited. For example, the second fitting portion 100 may be configured to include only one projection 101.

The number of the second fitting portions 100 of the above embodiment is not limited to two and may be changed to one, three or more.

Although the second fitting portions 100 particularly are provided on the facing surfaces 94A, 94B substantially facing each other in the third direction Z1, out of the two terminal accommodating portions 90A, 90B, in the inner housing 81 of the above embodiment, there is no limitation to this. For example, the second fitting portions 100 may be provided on outer surfaces not facing the other terminal accommodating portions 90, out of the terminal accommodating portions 90A, 90B.

Although the terminal accommodating portions 90A, 90B particularly are integrally formed through the base portion 82 in the inner housing 81 of the above embodiment, there is no limitation to this. For example, the terminal accommodating portions 90A, 90B may be separate components.

The inner member 130 in the second connector 70 of the above embodiment may be omitted.

The sealing members 140, 150 in the second connector 70 of the above embodiment may be omitted.

Although the first connector 20 of the above embodiment particularly is configured to include two first terminal members 21, the first connector 20 may be configured to include one, three or more first terminal members 21.

Although the second connector 70 of the above embodiment particularly is configured to include two second terminal members 71, the second connector 70 may be configured to include one, three or more second terminal members 71.

The embodiment disclosed this time should be considered illustrative in all aspects, rather than restrictive. The scope of the present invention is intended to be represented not by the above meaning, but by the scope of claims and include all changes in the scope of claims and in the meaning and scope of equivalents.

What is claimed is:

1. A first connector attachable to and detachable from a second connector, the first connector comprising:

one or more first terminal members having respective tip parts extending in a first direction; and a first connector housing for holding the one or more first terminal members, wherein:

the first connector housing includes a first wall having a tip part extending in the first direction, the first wall includes a first fitting portion to be convex-concavely fit to a second fitting portion provided in the second connector, the first fitting portion is engaged with the second fitting portion in a second direction intersecting an assembling direction of the first and second connectors when the first connector is mated to the second connector, the first fitting portion includes a plurality of first projections projecting toward one of the one or more first terminal members, each of the plurality of first projections extending from the first wall along a third direction intersecting the first and second directions, and each of the one or more the first terminal members has a first surface facing the plurality of first projections in the third direction, such that a shortest distance L1 is configured between the first surface and respective tips of the plurality of first projections in the third direction.

2. The first connector according to claim 1, wherein the first surface of each of the one or more the first terminal members is a connection surface to be connected to a second terminal member provided in the second connector.

3. The first connector according to claim 2, wherein: each of the one or more the first terminal members has a second surface provided on a side opposite to the first surface in the third direction, the first connector housing includes a second wall having a tip part extending in the first direction, the second wall is provided on a side substantially opposite to the first wall in the third direction, and the second wall has a third surface facing the second surface in the third direction, such that a shortest distance L2 is configured between the third surface of the second wall and the second surface in the third direction and such that the shortest distance L2 and the shortest distance L1 satisfy a relationship of $L2 \leq L1$.

4. The first connector according to claim 1, wherein: the one or more first terminal members include a plurality of first terminal members provided substantially side by side along the third direction, and the first wall is provided between an adjacent pair of the plurality of first terminal members in the third direction.

5. The first connector according to claim 1, wherein: the assembling direction is a direction parallel to the first direction, and the first connector housing includes:

a protecting portion for covering around the one or more first terminal members except parts in the second direction in directions orthogonal to the first direction;

a first opening open in the first direction in the protecting portion; and a second opening open in the second direction in the protecting portion.

6. The first connector according to claim 5, wherein: the protecting portion includes a pair of side walls constituting the second opening, the first wall is one of the pair of side walls, and each of the plurality of first projections projects from an inner surface of the one side wall.

7. The first connector according to claim 5, wherein: the one or more first terminal members include two first terminal members substantially adjacent to each other in the third direction, the protecting portion includes a first protecting portion for protecting one of the two first terminal members and a second protecting portion for protecting the other of the two first terminal members, the plurality of first projections includes a first projection provided on the first protecting portion and a second projection provided on the second protecting portion, the first projection projects toward the one first terminal member from an inner surface of a side wall provided between the two first terminal members in the third direction, out of the first protecting portion, and the second projection projects toward the other first terminal member from an inner surface of a side wall provided between the two first terminal members in the third direction, out of the second protecting portion.

8. The first connector according to claim 1, wherein: the first fitting portion further includes a first recess recessed from a projecting end surface of the first projection, each of the plurality of first projections has at least one first inclined surface inclined with respect to a plane orthogonal to the assembling direction, and the at least one first inclined surface guides at least one third projection of the second fitting portion into the first recess when the second connector is assembled with the first connector.

9. The first connector according to claim 8, wherein: the first recess has at least one second inclined surface inclined with respect to the plane orthogonal to the assembling direction, and the at least one second inclined surface guides the third projection of the second fitting portion into the first recess when the second connector is assembled with the first connector.

10. The first connector according to claim 1, wherein the first connector housing includes:

at least one base portion for holding base end part(s) of the first terminal member(s);

the first wall projecting in the first direction from the base portion; and at least one reinforcing portion coupling a base end part of the first wall and the base portion.

11. A second connector attachable to and detachable from a first connector, the second connector comprising:

one or more second terminal members;

an inner housing for accommodating the one or more second terminal members; and an outer housing for at least partly accommodating the inner housing, wherein:

the inner housing is a component separate from the outer housing, the inner housing includes a second fitting portion to be convex-concavely fit to a first fitting portion provided in the first connector, and the second fitting portion is to be engaged with the first fitting portion in a second direction intersecting an assembling direction of the first and second connectors, the second connector further comprising an inner member to be mounted on an end part in the second direction of the outer housing, the inner member configured to support the inner housing inside the outer housing by pressing the inner housing toward an inner surface of a bottom wall of the outer housing.

12. The second connector according to claim 11, wherein: the inner housing includes a base portion and at least one terminal accommodating portion extending from the base portion, the at least one terminal accommodating portion at least partly accommodates the one or more second terminal members inside, and the second fitting portion is provided on an outer surface of the terminal accommodating portion.

13. The second connector according to claim 12, wherein: the one or more second terminal members include a plurality of second terminal members provided substantially side by side along a third direction intersecting the second direction, the at least one terminal accommodating portion includes a first terminal accommodating portion and a second terminal accommodating portion provided away from the first terminal accommodating portion in the third direction, the first terminal accommodating portion has a first facing surface facing the second terminal accommodating portion in the third direction, the second terminal accommodating portion has a second facing surface facing the first facing surface, and the second fitting portion includes a third projection projecting toward the second facing surface from the first facing surface and a fourth projection projecting toward the first facing surface from the second facing surface.

14. The second connector according to claim 13, wherein:

the second fitting portion further includes a second recess recessed toward the first facing surface from a projecting end surface of the third projection, the third projection has at least one third inclined surface inclined with respect to a plane orthogonal to the assembling direction, and the third inclined surface guides a first projection of the first fitting portion into the second recess when the second connector is assembled with the first connector.

15. The second connector according to claim 14, wherein:

the second recess has at least one fourth inclined surface inclined with respect to the plane orthogonal to the assembling direction, and the fourth inclined surface guides the first projection of the first fitting portion into the second recess when the second connector is assembled with the first connector.

16. The second connector according to claim 13, wherein:

the first and second terminal accommodating portions are integrally or unitarily formed through the base portion, and the inner member supports the inner housing by contacting the base portion.

17. The second connector according to claim 11, further comprising at least one of:

an annular sealing member to be fit inside the inner member; and an annular sealing member to be externally fit on the inner member, wherein the inner member includes:

a body portion having a ring shape;

a projecting portion projecting in a direction (Y2) opposite to the second direction from an end surface of the body portion; and an engaging portion provided in correspondence to an engaging portion of the outer housing.

18. A connector assembly, comprising:

the first connector according to claim 1; and the second connector according to claim 11 attachable to and detachable from the first connector.

* * * * *